United States Patent
Schultz et al.

(10) Patent No.: US 9,753,950 B2
(45) Date of Patent: Sep. 5, 2017

(54) VIRTUAL PROPERTY REPORTING FOR AUTOMATIC STRUCTURE DETECTION

(71) Applicant: Pictometry International Corp., Rochester, NY (US)

(72) Inventors: Stephen L. Schultz, West Henrietta, NY (US); David Arthur Kennedy, Webster, NY (US); James Smyth, Warrenton, VA (US)

(73) Assignee: Pictometry International Corp., Rochester, NY (US)

( * ) Notice: Subject to any disclaimer, the term of this patent is extended or adjusted under 35 U.S.C. 154(b) by 450 days.

(21) Appl. No.: 13/840,258

(22) Filed: Mar. 15, 2013

(65) Prior Publication Data
US 2014/0280269 A1 Sep. 18, 2014

(51) Int. Cl.
*G06F 17/30* (2006.01)
*G06Q 50/16* (2012.01)
*G06K 9/00* (2006.01)

(52) U.S. Cl.
CPC .... *G06F 17/30277* (2013.01); *G06F 17/3087* (2013.01); *G06F 17/30241* (2013.01); *G06F 17/30268* (2013.01); *G06Q 50/16* (2013.01); *G06K 9/00637* (2013.01)

(58) Field of Classification Search
CPC .......................... G06Q 50/163; G06F 17/30241
See application file for complete search history.

(56) References Cited

U.S. PATENT DOCUMENTS

| | | |
|---|---|---|
| 2,273,876 A | 2/1942 | Lutz et al. |
| 3,153,784 A | 10/1964 | Petrides et al. |
| 3,594,556 A | 7/1971 | Edwards |

(Continued)

FOREIGN PATENT DOCUMENTS

| | | |
|---|---|---|
| AT | 331204 T | 7/2006 |
| BR | 0316110 | 9/2005 |

(Continued)

OTHER PUBLICATIONS

Ackermann, Prospects of Kinematic GPS Aerial Triangulation, ITC Journal, 1992.

(Continued)

*Primary Examiner* — Mohammad S Rostami
(74) *Attorney, Agent, or Firm* — Dunlap Codding, P.C.

(57) ABSTRACT

A computer system comprises a processor capable of executing processor executable code operably coupled with a non-transitory computer medium storing processor executable code, which when executed by the processor causes the processor to: (a) receive a first signal over a computer network, the first signal indicative of a request for information about a target structure from a user; (b) in response to receiving the first signal, access a database including information about the target structure; and (c) transmit a second signal over the computer network indicative of a virtual property report for the target structure including at least one image of the target structure. The virtual property report may include information about a facet of the target structure facing a street, location of a main entrance of the target structure, location of a secondary entrance of the target structure, location of vehicle access to the target structure.

15 Claims, 16 Drawing Sheets

(56) References Cited

U.S. PATENT DOCUMENTS

| | | |
|---|---|---|
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | McLaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,794,216 A | 8/1998 | Brown |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,852,810 A | 12/1998 | Sotiroff et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,424,133 B2 | 9/2008 | Schultz et al. |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0140064 A1* | 7/2003 | Klein ............... G06F 17/30893 |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0034074 A1* | 2/2005 | Munson ............... G09B 29/106 715/712 |
| 2005/0073241 A1 | 4/2005 | Yamauchi et al. |
| 2005/0073532 A1 | 4/2005 | Scott et al. |
| 2005/0088251 A1 | 4/2005 | Matsumoto |
| 2005/0169521 A1 | 8/2005 | Hel-Or |
| 2005/0273346 A1* | 12/2005 | Frost ..................... G06Q 30/00 705/316 |
| 2005/0288957 A1 | 12/2005 | Eraker et al. |
| 2006/0028550 A1 | 2/2006 | Palmer et al. |

(56) References Cited

U.S. PATENT DOCUMENTS

| | | | |
|---|---|---|---|
| 2006/0092043 A1 | 5/2006 | Lagassey | |
| 2006/0238383 A1 | 10/2006 | Kimchi et al. | |
| 2006/0250515 A1 | 11/2006 | Koseki et al. | |
| 2007/0024612 A1 | 2/2007 | Balfour | |
| 2007/0046448 A1 | 3/2007 | Smitherman | |
| 2007/0219712 A1* | 9/2007 | Abhyanker | G06Q 10/087 701/532 |
| 2007/0237420 A1 | 10/2007 | Steedly et al. | |
| 2008/0120031 A1 | 5/2008 | Rosenfeld et al. | |
| 2008/0123994 A1 | 5/2008 | Schultz et al. | |
| 2008/0162032 A1* | 7/2008 | Wuersch | G08G 1/005 701/533 |
| 2009/0132316 A1* | 5/2009 | Florance | G06Q 30/06 701/532 |
| 2009/0177458 A1 | 7/2009 | Hochart et al. | |
| 2009/0208095 A1 | 8/2009 | Zebedin | |
| 2009/0304227 A1 | 12/2009 | Kennedy et al. | |
| 2010/0296693 A1 | 11/2010 | Thornberry et al. | |
| 2011/0033110 A1 | 2/2011 | Shimamura et al. | |
| 2011/0096083 A1* | 4/2011 | Schultz | G06T 17/05 345/583 |
| 2012/0101783 A1 | 4/2012 | Stephens et al. | |
| 2013/0036031 A1* | 2/2013 | Hutchinson | G06Q 50/16 705/30 |
| 2013/0182108 A1* | 7/2013 | Meadow | G06T 17/05 348/143 |
| 2013/0262530 A1* | 10/2013 | Collins | G06F 17/30312 707/812 |
| 2013/0346020 A1* | 12/2013 | Pershing | G06Q 10/06 702/156 |
| 2014/0279593 A1* | 9/2014 | Pershing | G06Q 10/10 705/314 |
| 2014/0310162 A1* | 10/2014 | Collins | G06F 3/04842 705/39 |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| EP | 1903491 A1 | 3/2008 |
| ES | 2266704 T | 3/2007 |
| JP | 2003/317089 A | 11/2003 |
| JP | 2006-119797 A | 5/2006 |
| JP | 2012-209833 A | 10/2012 |
| MX | PA05004987 | 2/2006 |
| WO | WO99/18732 | 4/1999 |
| WO | WO/00/53090 | 9/2000 |
| WO | WO/2004/044692 | 5/2004 |
| WO | WO 2004-111973 A1 | 12/2004 |
| WO | WO/2005/0888251 | 9/2005 |
| WO | WO/2008/028040 | 3/2008 |
| WO | WO 2012-112009 A2 | 8/2012 |

OTHER PUBLICATIONS

Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava 27.—30.1.2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in The Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.
Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf.2000.
Slaymaker, et al.," Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", In Pro-

(56) References Cited

OTHER PUBLICATIONS ceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", Microimages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos ", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(1): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.

(56) References Cited

OTHER PUBLICATIONS

AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images, " Institute for Robotics and Intelligent Systems, University of Southern California, Nov. 27, 2001, 32 pages.
Applicad Reports dated Nov. 25, 1999—Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Korean Intellectual Property Office, International Search Report and Written Opinion, Mail Date Aug. 29, 2014.
European Patent Office, Supplementary European Search Report and European Search Opinion regarding European Patent Application No. 14771085.9, dated Sep. 29, 2016.
Mexican Patent Office, Official Action regarding Mexican Patent Application No. MX/a/2015/012467 in Spanish and English translation in summary, dated Feb. 23, 2017.

\* cited by examiner

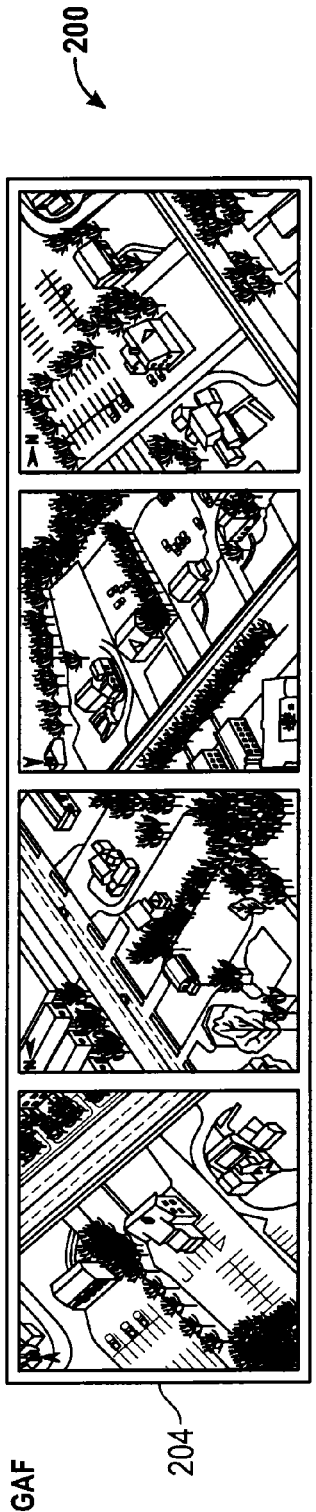

206 — Your foundation is estimated at 20.2 squares\*+/- 10%

A copy of your report is being sent to the following GAF Master Elite Contractors who will be able to provide a quotation for repair services.

Contractor 1
123 Main Street
Anywhere, MY 11735
800Contractor1

Contractor 2
456 Main Street
Anywhere, MY 107470
800Contractor2

\*DISCLAIMER: The information contained in this report is for estimating purposes, and should be verified by a structural engineer. Use of this report is subject to terms and conditions found at www.pictometry.com/roof.

REPORT DETAILS : INTRODUCTION

208

HOMEOWNER
John Homeowner      Order # : PIC-000012840
1440 Monroe Ave     Phone  : 123-456-7890
Rochester NY, 14618  Email  : homeowner@gaf.com

REPORT BY

Find out more: GeoEstimator.com

Copyright 2011 - Pictometry International corp. - All Rights Reserved. Do not scan or otherwise copy. Copying is illegal. For example, do not make or distribute copies for collecting bids or estimates. | Page: 2 |

GAF

FIG. 9 (Continued)

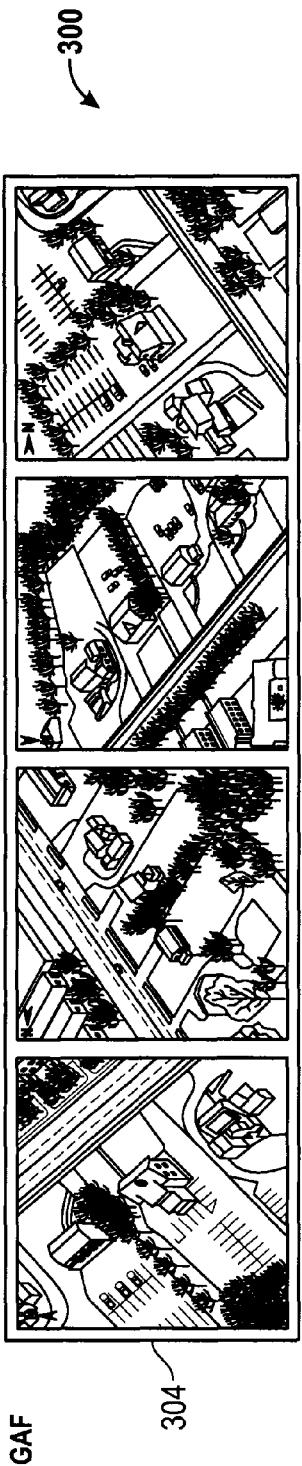

You have 6 windows:
2   18" × 24"
3   30" × 60"
1   35.5 × 83"

A copy of your report is being sent to the following GAF Master Elite Contractors who will be able to provide a quotation for installation services.

Contractor 1
123 Main Street
Anywhere, MY 11735
800Contractor1

Contractor 2
456 Main Street
Anywhere, MY 107470
800Contractor2

*DISCLAIMER: The information contained in this report is for estimating purposes, and should be verified by a roofing professional. Use of this report is subject to terms and conditions found at www.pictometry.com/roof.

REPORT DETAILS : INTRODUCTION

HOMEOWNER
John Homeowner      Order # : PIC-000012840
1440 Monroe Ave     Phone : 123-456-7890
Rochester NY, 14618  Email : homeowner@gaf.com

Copyright 2011 - Pictometry International corp. - All Rights Reserved. Do not scan or otherwise copy. Copying is illegal. For example, do not make or distribute copies for collecting bids or estimates.   Page: 2

FIG. 10 (Continued)

VIRTUAL PROPERTY REPORTING FOR AUTOMATIC STRUCTURE DETECTION

BACKGROUND

In the remote sensing/aerial imaging industry, imagery may be used to capture views of a geographic area in order to measure objects and/or structures within the images. These are generally referred to as "geo-referenced images" and come in two basic categories:

Vertical Imagery—images captured with a camera pointed vertically downward thus generally capturing the tops of structures; and Oblique Imagery—images captured with a camera aimed at an angle capturing the sides, as well as, tops of structures.

Most vertical imagery may be processed in order to fit a mathematically rectangular projection or map. This process is known as ortho-rectification and attempts to create an appearance as if the sensor were directly above each pixel in the image. The resulting image is known as an ortho-photo. Since the images are mathematically projected, they may be combined into a seamless mosaic resulting in a composite image known as an ortho-mosaic. The term 'ortho image' is used to denote a geo-referenced image that is either an ortho-photo image or an ortho-mosaic image.

Because they are captured looking straight down, an ortho-photo or ortho-mosaic contains a view of the world to which many are not accustomed. As a result, there may be difficulty in distinguishing between two different properties (e.g., buildings, structures, and/or other man-made or natural objects or features) as the only portions of the structures visible in the ortho-mosaic are rooftops. An oblique image, in contrast, is captured at an angle showing sides of objects and structures. Aerial imagery may be used in identification of dimensions of buildings or structures. Traditional ortho-rectified imagery has limited use, however, because it reveals only the edge of the roof and does not reveal several important aspects of the building.

SUMMARY

In one aspect, the inventive concepts disclosed herein are directed to a computer system comprising at least one processor capable of executing processor executable code operably coupled with a non-transitory computer medium storing processor executable code, which when executed by the at least one processor causes the at least one processor to: (a) receive a first signal over a computer network, the first signal indicative of a request for information about a target structure from a user; (b) in response to receiving the first signal, access a database including information about the target structure; and (c) transmit a second signal over the computer network, the second signal indicative of a virtual property report for the target structure including at least one image of the target structure.

The processor executable code when executed by the at least one processor may further cause the processor to determine using aerial imagery and at least one data set indicative of street files information about one or more of: a facet of the target structure facing a street, location of a main entrance of the target structure relative to the street, location of a secondary entrance of the target structure relative to the street, location of vehicle access to the target structure within the at least one image, and to store the information in the database and be associated with the target structure. The processor executable code for determining the information may be organized to be executed by the at least one processor prior to executing the instructions to receive the first signal. The processor executable code when executed by the at least one processor may further cause the processor to access the information indicative of the facet of the target structure facing the street, and retrieve and display an image of the facet within the virtual property report. The processor executable code when executed by the at least one processor may also cause the at least one processor to receive a selection of one or more pixels within a displayed image of the target structure in which the one or more pixels have pixel coordinates, transform the pixel coordinates into real-world geographic coordinates, measure distances between the real-world coordinates, and store the measurements on a non-transitory computer readable medium within the database and associated with the target structure, prior to the step of receiving the first signal over the computer network. The processor executable code when executed by the at least one processor may further cause the at least one processor to associate a label identifying the measurement with a particular measurement, and store the label with the measurement within the database and associated with the target structure. The label identifying the measurement may be a particular field within the database, and/or may be selected from the group including orientation and area of a driveway depicted within the displayed image, size or area or elevations of a deck depicted within the displayed image, location and height of trees adjacent to the target structure, areas of windows of the target structure, area of a vertical or pitched surface on the target structure, a height of an eave of the target structure, a height of a chimney of the target structure, a distance to a church from the target structure.

The processor executable code when executed by the at least one processor may further cause the at least one processor to analyze a parcel database to determine an identity of neighboring parcels either adjacent to the target structure or within a predefined radius of the target structure, and to make available to a user information related to neighboring parcels when accessing information indicative of the target structure. The processor executable code when executed by the at least one processor may further cause the at least one processor to identify ownership or residency of neighboring parcels and to store a link within the database to information indicative of the owners or residents of neighboring parcels. The processor executable code when executed by the at least one processor may also cause the at least one processor to identify social media information of owners or residents of neighboring parcels and to store information within the database indicative of the social media information of the owners or residents of the neighboring parcels.

In a further aspect, the inventive concepts disclosed herein are directed to a non-transitory computer readable medium storing computer executable instructions that when executed by a processor cause the one or more processor to determine data indicative of one or more predetermined features of a target structure displayed in an image, the one or more predetermined features selected from: a facet of the target structure facing a street, location of a main entrance of the target structure relative to the street, location of a secondary entrance of the target structure relative to the street, orientation and area of a driveway of the target structure, location of vehicle access to the target structure, size and area and elevations of a deck of the target structure, real-world geographic location and height of a tree depicted in the image with the target structure, a geographic location of a trunk of a tree depicted in the image with the target structure, an area of a window of the target structure, an area of siding (e.g., an area of a wall or portion of a wall) of the target structure depicted within multiple aerial images, a height of an eave of the target structure, height of a chimney of the target structure, a distance to one or more churches from the target structure, and/or social media information of a neighbor of the target structure.

In a further aspect, the inventive concepts disclosed herein are directed to a computer system comprising at least one processor capable of executing processor executable code operably coupled with a non-transitory computer readable medium storing processor executable code, which when executed by the at least one processor causes the at least one processor to: (a) receive a first signal over a computer network, the first signal indicative of a request for information about a target structure from a user; (b) in response to receiving the first signal, access a database including multiple aerial images of the target structure; (c) automatically identify an aerial image from the multiple aerial images depicting a facet of the target structure that faces a street; and (d) transmit a second signal over the computer network, the signal indicative of the aerial image of the target structure depicting the facet of the target structure that faces the street. The processor executable code may further cause the processor to transmit a sequence of third signals depicting the multiple aerial images following the transmission of the second signal. The processor executable code may also cause the at least one processor to identify the facet of the target structure that faces the street by: (1) accessing a file identifying the street; (2) projecting a line through at least a portion of a facet of the target structure to the street; and (3) identifying the facet that the line is projected through as the facet of the target structure that faces the street. The processor executable code may further cause the at least one processor to identify a rear facet of the target structure as a facet that is positioned at about 180° relative to the facet of the target structure that faces the street.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF EXEMPLARY EMBODIMENTS

Figure 1:
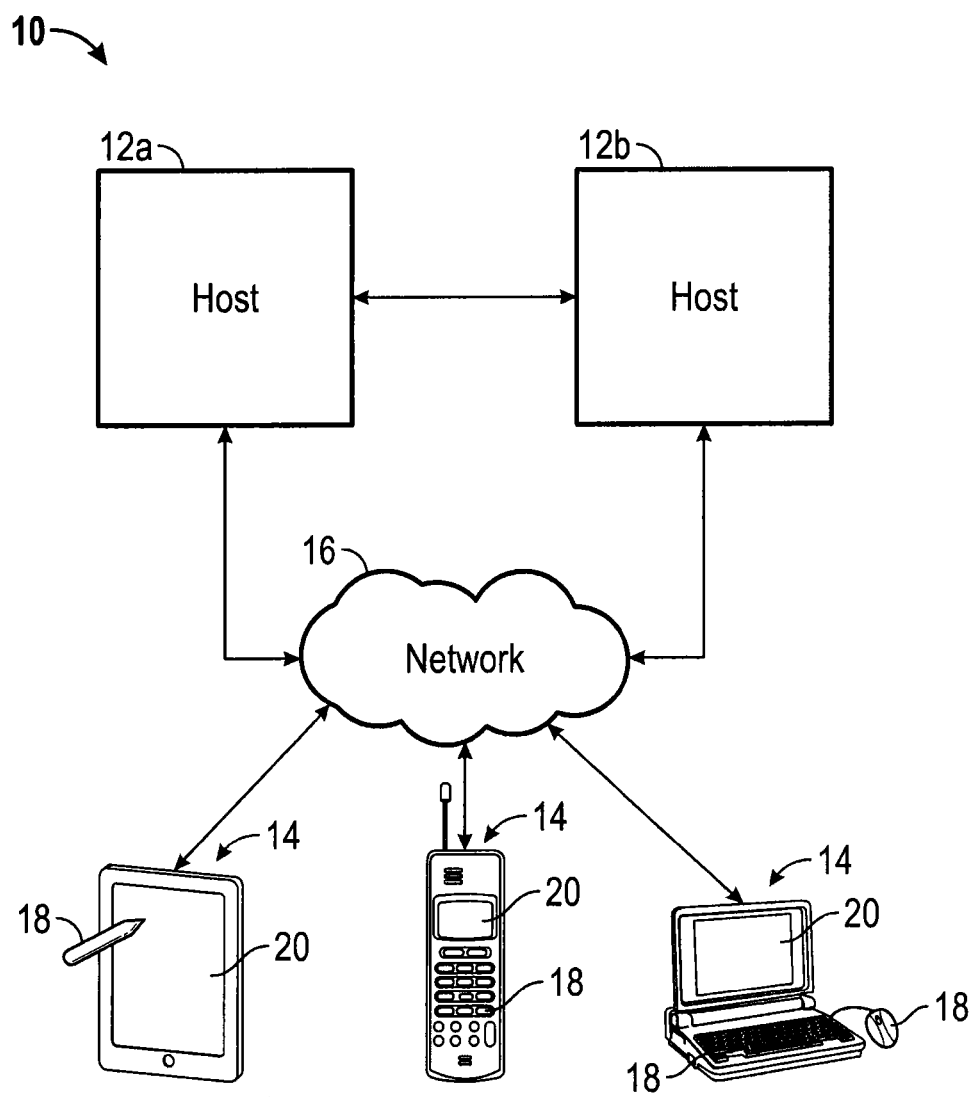
FIG. 1 is a schematic diagram of hardware forming an exemplary embodiment of a computer system constructed in accordance with the present disclosure.

Before explaining at least one embodiment of the inventive concepts disclosed herein in detail, it is to be understood that the disclosure is not limited in its application to the details of construction, experiments, exemplary data, and/or the arrangement of the components set forth in the following description or illustrated in the drawings.

The inventive concepts disclosed herein are capable of other embodiments or of being practiced or carried out in various ways. Also, it is to be understood that the phraseology and terminology employed herein is for purpose of description and should not be regarded as limiting.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus.

As used in the instant disclosure, the terms "provide", "providing", and variations thereof comprise displaying or providing for display of a webpage (e.g., structure detection webpage) to one or more user terminals (e.g., an access point) interfacing with a computer and/or computer network(s) and/or allowing the one or more user terminal(s) to participate, such as by interacting with one or more mechanisms on a webpage (e.g., structure detection webpage) by sending and/or receiving signals (e.g., digital, optical, and/or the like) via a computer network interface (e.g., Ethernet port, TCP/IP port, optical port, cable modem, a DSL modem, POTS modem, and combinations thereof). A user may be provided with a web page in a web browser, or in a software application, for example.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment," "an embodiment", "one example," or "an example" means that a particular element, feature, structure, or characteristic described in connection with the embodiment is included in at least one embodiment. The appearances of the phrase "in one embodiment" or "one example" in various places in the specification are not necessarily all referring to the same embodiment or example.

Circuitry, as used herein, may be analog and/or digital, components, or one or more suitably programmed microprocessors and associated hardware and software, or hardwired logic. Also, "components" may perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transitory memory includes random access memory, read only memory, flash memory or the like. Such non-transient memory may be electrically based or optically based, for example.

Generally, but not by way of limitation, the inventive concepts disclosed herein are directed to computer systems, databases, and methods for visual insight for a target location and/or property, stemming from a confluence of accumulated relevant data, visualizing imagery, maps, and measurement-based analysis. The target property or location may be any manmade or natural structure, building, or feature. Visual insight according to the inventive concepts disclosed herein may be provided to users in the form of virtual property reports including one or more images of the property, as will be described in detail herein, for example. Automated or semi-automated algorithms may be used to determine any measurements relating to the target location, and a user or an administrator may review the determination of the algorithms and accept or edit the determination, or direct the algorithm to start over, for example.

Referring now to the figures, and in particular to FIG. 1, shown therein is an exemplary structure detection system 10 constructed in accordance with the present disclosure. System 10 may be a system or systems that are able to embody and/or execute the logic of the processes described herein. Logic embodied in the form of software instructions or firmware may be executed on any appropriate hardware. For example, logic embodied in the form of software instructions or firmware may be executed on dedicated system or systems, or on a personal computer system, or on a distributed processing computer system, or the like. In some embodiments, logic may be implemented in a stand-alone environment operating on a single computer system and/or logic may be implemented in a networked environment such as a distributed system using multiple computers and/or processors exchanging signals over a computer network and/or via one or more computer ports.

In some exemplary embodiments, system 10 may be distributed, and include one or more host systems 12 communicating with one or more user devices 14 via a network 16. As used herein, the terms "network-based," "cloud-based," and any variations thereof, are intended to include the provision of configurable computational resources on demand via interfacing with a computer and/or computer network, with software and/or data at least partially located on the computer and/or computer network, by pooling processing power of two or more networked processors.

In some exemplary embodiments, the network 16 may be the Internet and/or other network. For example, if the network 16 is the Internet, a primary user interface of system 10 may be delivered through a series of web pages. It should be noted that the primary user interface of the system 10 may be replaced by another type of interface, such as a Windows-based application (e.g., deploying the system 10 in a stand-alone environment such as a kiosk).

The network 16 may be almost any type of network. For example, in some embodiments, the network 16 may be an Internet and/or Internet 2 network (e.g., exist in a TCP/IP-based network). It is conceivable that in the near future, embodiments of the present disclosure may use more advanced networking topologies.

The one or more user devices 14 may include, but are not limited to implementation as a personal computer, a smart phone, network-capable television set, a television set-top box, a tablet, an e-book reader, a laptop computer, a desktop computer, a network-capable handheld device, a video game console, a server, a digital video recorder, a DVD-player, a Blu-Ray player, and combinations thereof, for example. In some embodiments, the user device 14 may include one or more input devices 18, one or more output devices 20, one or more processors (not shown) capable of interfacing with the network 16, processor executable code, and/or a web browser capable of accessing a website and/or communicating information and/or data over a network, such as the network 16. As will be understood by persons of ordinary skill in the art, the one or more user devices 14 may include one or more non-transitory computer memory comprising processor executable code and/or software applications, for example. Current embodiments of system 10 may also be modified to use any of these user devices 14 or future developed devices capable of communicating with the one or more host systems 12 via the network 16.

The one or more input devices 18 may be capable of receiving information input from a user and/or processor(s), and transmitting such information to the user device 14 and/or to the network 16. The one or more input devices 18 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, and combinations thereof, for example.

The one or more output devices 20 may be capable of outputting information in a form perceivable by a user and/or processor(s). For example, the one or more output devices 20 may include, but are not limited to, implementations as a computer monitor, a screen, a touchscreen, a speaker, a website, a television set, a smart phone, a PDA, a cell phone, a fax machine, a printer, a laptop computer, a web server, a network interface card or port, and combinations thereof, for example. It is to be understood that in some exemplary embodiments, the one or more input devices 18 and the one or more output devices 20 may be implemented as a single device, such as, for example, a touchscreen or a tablet. It is to be further understood that as used herein the term user is not limited to a human being, and may comprise, a computer, a server, a website, a processor, a network interface, a human, a user terminal, a virtual computer, and combinations thereof, for example.

The system 10 may include one or more host systems 12. For example, FIG. 1 illustrates system 10 having two host systems 12a and 12b although a single host system 12 may be included in system 10, or in the alternative, more than two host systems 12 may be included in system 10. In some embodiments, the host systems 12 may be partially or completely network-based or cloud based. The host system 12 may or may not be located in a single physical location. Additionally, multiple host systems 12 may or may not necessarily be located in a single physical location.

Each of the host systems 12 may be capable of interfacing and/or communicating with the one or more user devices 14 via the network 16. For example, the host systems 12 may be capable of interfacing by exchanging signals (e.g., analog, digital, optical, and/or the like) via one or more ports (e.g., physical ports or virtual ports) using a network protocol, for example. Additionally, each host system 12 may be capable of interfacing and/or communicating with other host systems directly and/or via the network 16, such as by exchanging signals (e.g., analog, digital, optical, and/or the like) via one or more ports.

For simplicity, the host system 12a may be referred to hereinafter as the "first host system" and the host system 12b may be referred to hereinafter as the "second host system." The network 16 may permit bi-directional communication of information and/or data between the first host system 12a, the second host system 12b, and/or user devices 14. The network 16 may interface with the first host system 12a, the second host system 12b, and the user devices 14 in a variety of ways. For example, the network 16 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 16 may be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and/or combinations thereof, for example. Additionally, the network 16 may use a variety of network protocols to permit bi-directional interface and/or communication of data and/or information between the first host system 12a, the second host system 12b, and/or one or more user devices 14.

Figure 2:
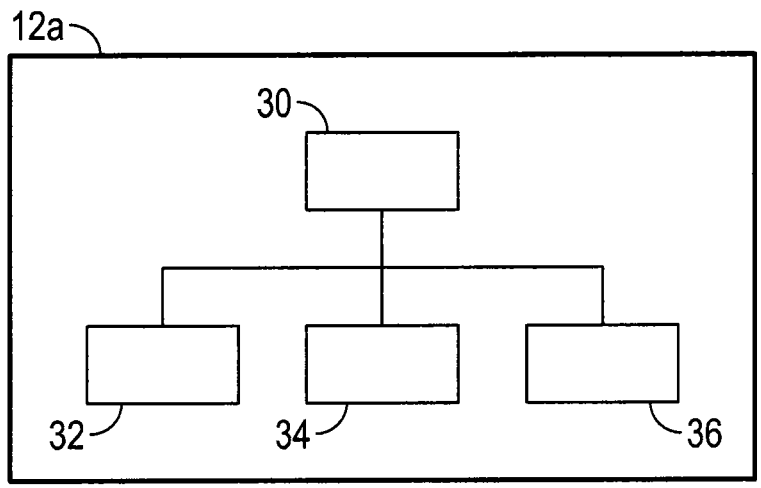
FIG. 2 is a block diagram of an embodiment of one or more host systems according to the instant disclosure.

Referring to FIGS. 1 and 2, in some embodiments, the first host system 12a may comprise one or more processors 30 working together, or independently to, execute processor executable code, one or more memories 32 capable of storing processor executable code, one or more input devices 34, and one or more output devices 36. Each element of the first host system 12a may be partially or completely network-based or cloud-based, and may or may not be located in a single physical location.

The one or more processors 30 may be implemented as a single or plurality of processors working together, or independently, to execute the logic as described herein. Exemplary embodiments of the one or more processors 30 may include, but are not limited to, a digital signal processor (DSP), a central processing unit (CPU), a field programmable gate array (FPGA), a microprocessor, a multi-core processor, and/or combinations thereof, for example. The one or more processors 30 may be capable of communicating with the one or more memories 32 via a path (e.g., data bus). The one or more processors 30 may be capable of communicating with the input devices 34 and/or the output devices 36.

The one or more processors 30 may be further capable of interfacing and/or communicating with the one or more user devices 14 via the network 16. For example, the one or more processors 30 may be capable of communicating via the network 16 by exchanging signals (e.g., analog, digital, optical, and/or the like) via one or more ports (e.g., physical or virtual ports) using a network protocol. It is to be understood, that in certain embodiments using more than one processor 30, the processors 30 may be located remotely from one another, located in the same location, or comprising a unitary multi-core processor. The one or more processors 30 may be capable of reading and/or executing processor executable code and/or capable of creating, manipulating, retrieving, altering, and/or storing data structures into one or more memories 32.

The one or more memories 32 may be a non-transitory computer memory capable of storing processor executable code. Additionally, the one or more memories 32 may be implemented as a non-transitory random access memory (RAM), a CD-ROM, a hard drive, a solid state drive, a flash drive, a memory card, a DVD-ROM, a floppy disk, an optical drive, and/or combinations thereof, for example.

In some embodiments, one or more memories 32 may be located in the same physical location as the first host system 12a, and/or the one or more memories 32 may be located remotely from the first host system 12a. For example, one or more memories 32 may be located remotely from the first host system 12a and communicate with the one or more processors 30 via the network 16. Additionally, when more than one memory 32 is used, a first memory 32 may be located in the same physical location as the one or more processors 30, and additional memories 32 may be located in a remote physical location from the one or more processors 30. It should be noted that the physical location(s) of the one or more memories 32 may be varied. Additionally, one or more of the memories 32 may be implemented as a "cloud memory" (i.e., one or more memories 32 may be partially or completely based on or accessed using the network 16).

The one or more input devices 34 may transmit data to the one or more processors 30 and may include, but are not limited to, implementations as a keyboard, a mouse, a touchscreen, a camera, a cellular phone, a tablet, a smart phone, a PDA, a microphone, a network adapter, and/or combination thereof, for example. The input devices 34 may be located in the same physical location as the one or more processors 30, or may be remotely located and/or partially or completely network-based.

The one or more output devices 36 may transmit information from the one or more processors 30 to a user, such that the information may be perceived by the user. For example, the output devices 36 may include, but are not limited to, implementations as a server, a computer monitor, a cell phone, a tablet, a speaker, a website, a PDA, a fax, a printer, a projector, a laptop monitor, and/or combinations thereof, for example. The one or more output devices 36 may be physically located with the one or more processors 30, or may be located remotely from the one or more processors 30, and may be partially or completely network based (e.g., website). As described herein, the term "user" is not limited to a human, and may comprise a human, a computer, a host system, a smart phone, a tablet, and/or combinations thereof, for example.

Figure 3:
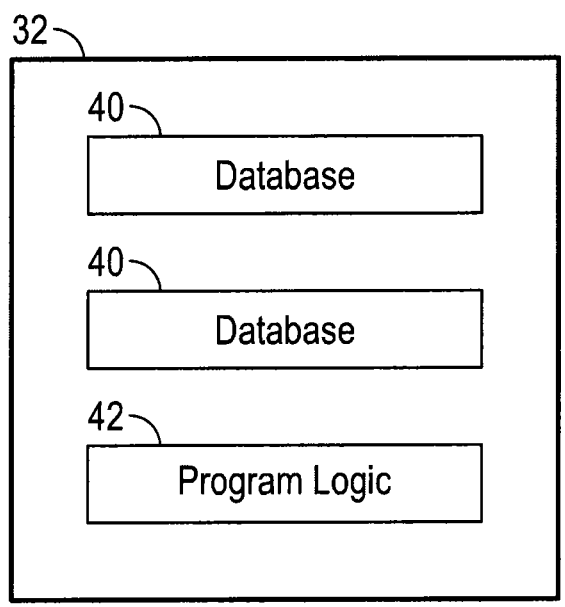
FIG. 3 is a block diagram of an embodiment of one or more memory according to the instant disclosure.

Referring to FIGS. 1-3, the one or more memories 32 may store processor executable code and/or information comprising one or more databases 40 and program logic 42. In some embodiments, the processor executable code may be stored as a data structure, such as a database and/or a data table in the one or more memories 32, for example.

The second host system 12b may be similar or substantially similar in design and concept as the first host system 12a as described herein. The first host system 12a may directly communicate with the second host system 12b and/or communicate via the network 16. Generally, the first host system 12a may include one or more processors 30 capable of executing a first set of processor executable code and the second host system 12b may include one or more processors 30 capable of executing a second set of processor executable code.

In some embodiments, the first host system 12a and the second host system 12b may be independently or cooperatively controlled by separate entities, or may be controlled by the same entity. For example, the first host system 12a may be controlled by a first company and the second host system 12b may be controlled by a second company distinct from the first company. For example, the first host system 12a may be controlled by an imaging company and the second host system 12b may be controlled by a building material supplier. The imaging company may be a separate entity from the building material supplier. Other entities may control either the first host system 12a and/or the second host system 12b including, but not limited to, building contractors, real estate agencies, weather agencies, community agencies, home maintenance companies (e.g., gardeners, housekeeping services, window washers, pool maintenance companies, cleaning companies, and/or the like), federal agencies, state agencies, municipal agencies, schools, religious organizations, sport and recreation agencies, insurance agencies, historical commissions, utility agencies (e.g., water, gas, electric, sewer, phone, cable, internet, and/or the like), commercial agencies (e.g., grocery stores, big box stores, malls, restaurants, gas/auto service stations, and/or the like), news agencies, travel agencies, mapping agencies, and/or the like.

In general, system 10 may be configured to display and navigate geo-referenced imagery, such as aerial oblique imagery or aerial orthogonal imagery, and/or maps, sketches, and two-dimensional or three-dimensional models (e.g., location-centric). The geo-referenced imagery may be represented by a pixel map and/or by a series of tiled pixel maps that when aggregated recreate an image pixel map. Alternatively, the oblique imagery may be applied to one or more maps (e.g., street or parcel) or two-dimensional or three-dimensional models of structure(s) 102 depicted within the one or more two or three-dimensional models, rather than being applied to an image pixel map, for example. The geo-referenced imagery may be stored in a database 40 as one or more electronic files that may be rendered into a picture, an image, or a sketch. The electronic files may be in any suitable image format (e.g., JPEG, BMP, TIFF, and/or the like).

The system 10 will be described by way of an example utilizing aerial geo-reference images as the geo-referenced imagery. However, it should be understood that system 10 may use other types of geo-referenced images and/or geo-referenced information, such as architectural images, sketches, street-view type images, terrestrial images, and combinations thereof, for example.

Figure 4:
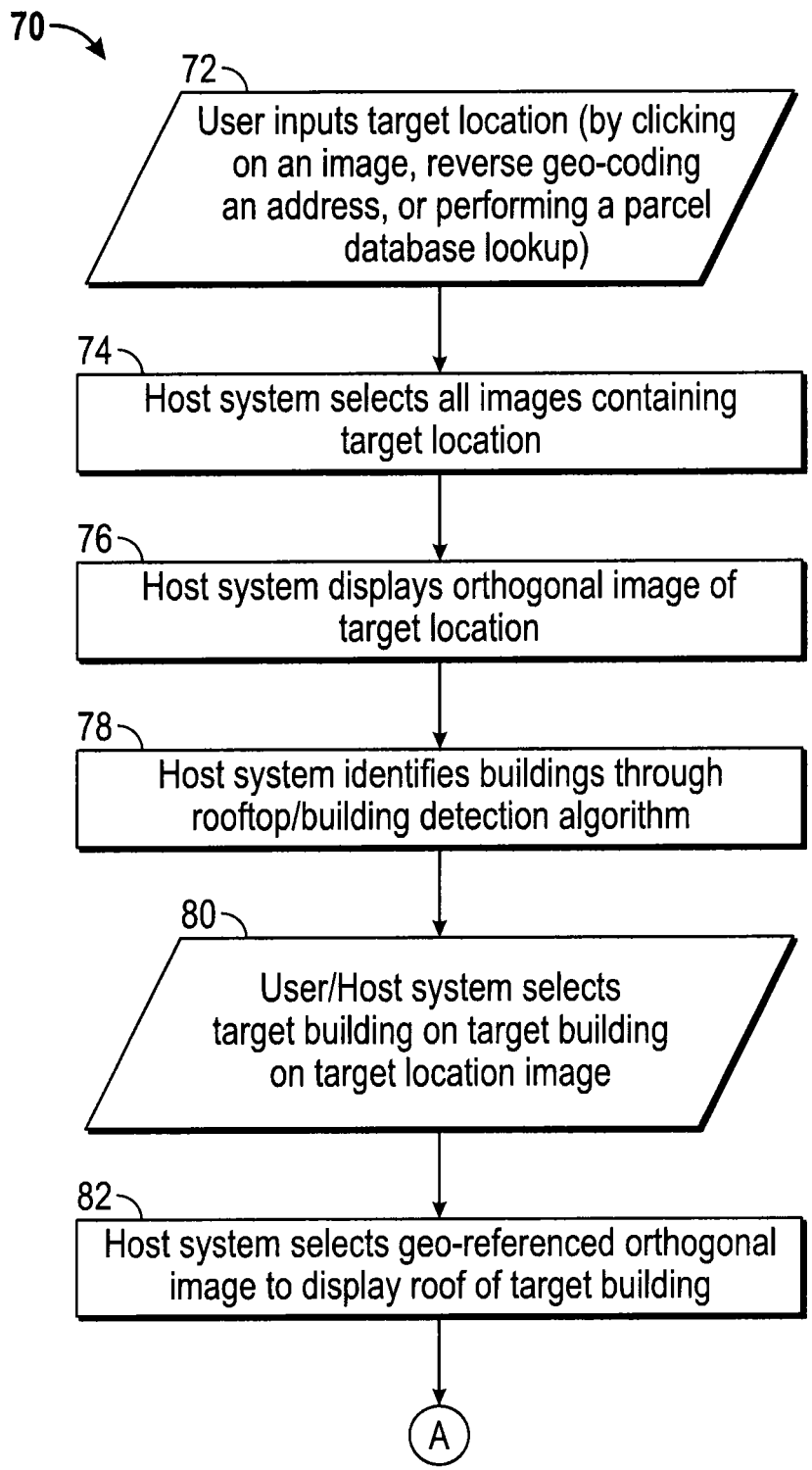
FIG. 4 is a flowchart of an exemplary method for determining one or more physical attributes and dimensions of a foundation of a structure in accordance with the present disclosure.
Figure 4:
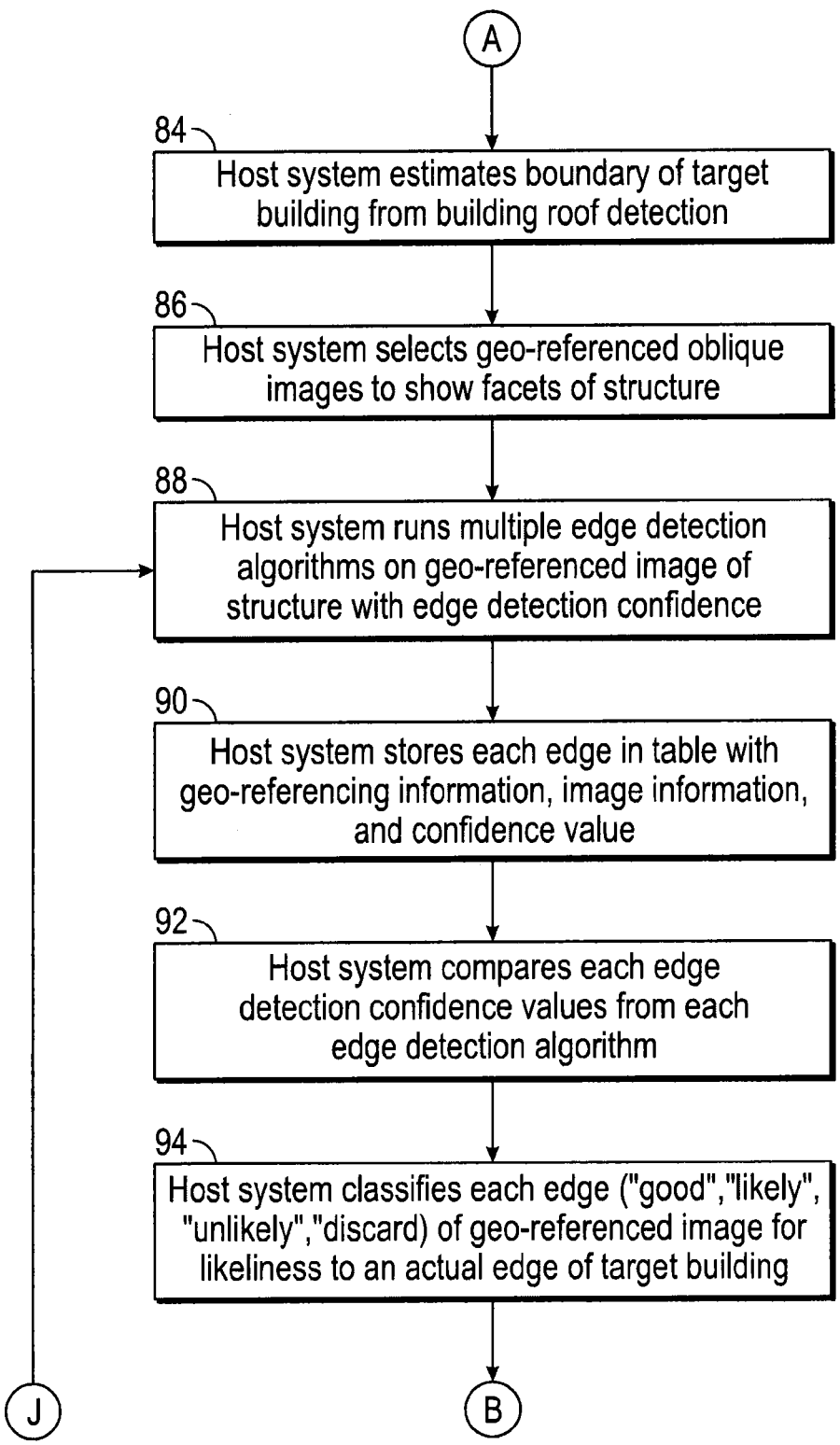
Figure 4:
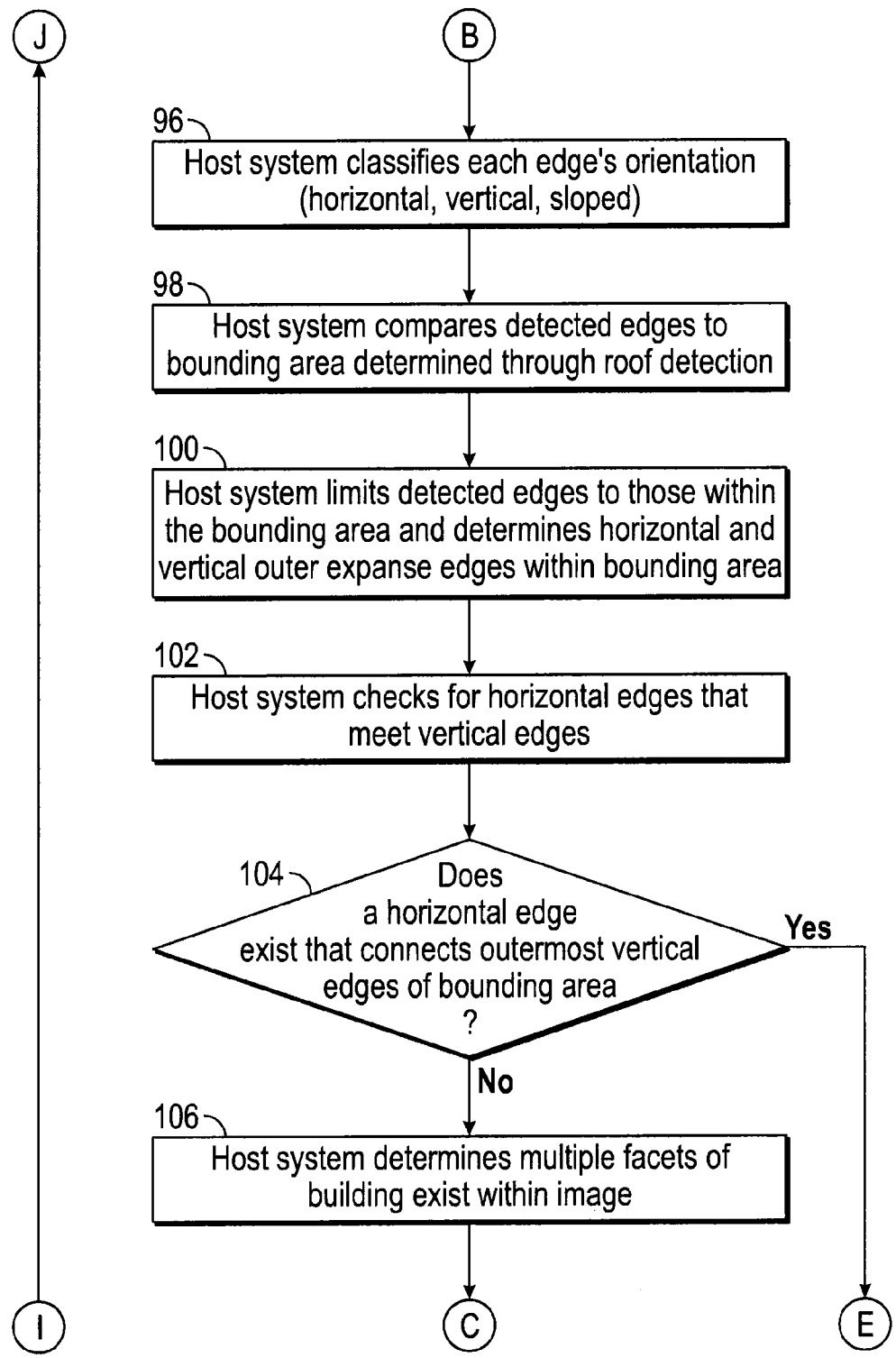
Figure 4:
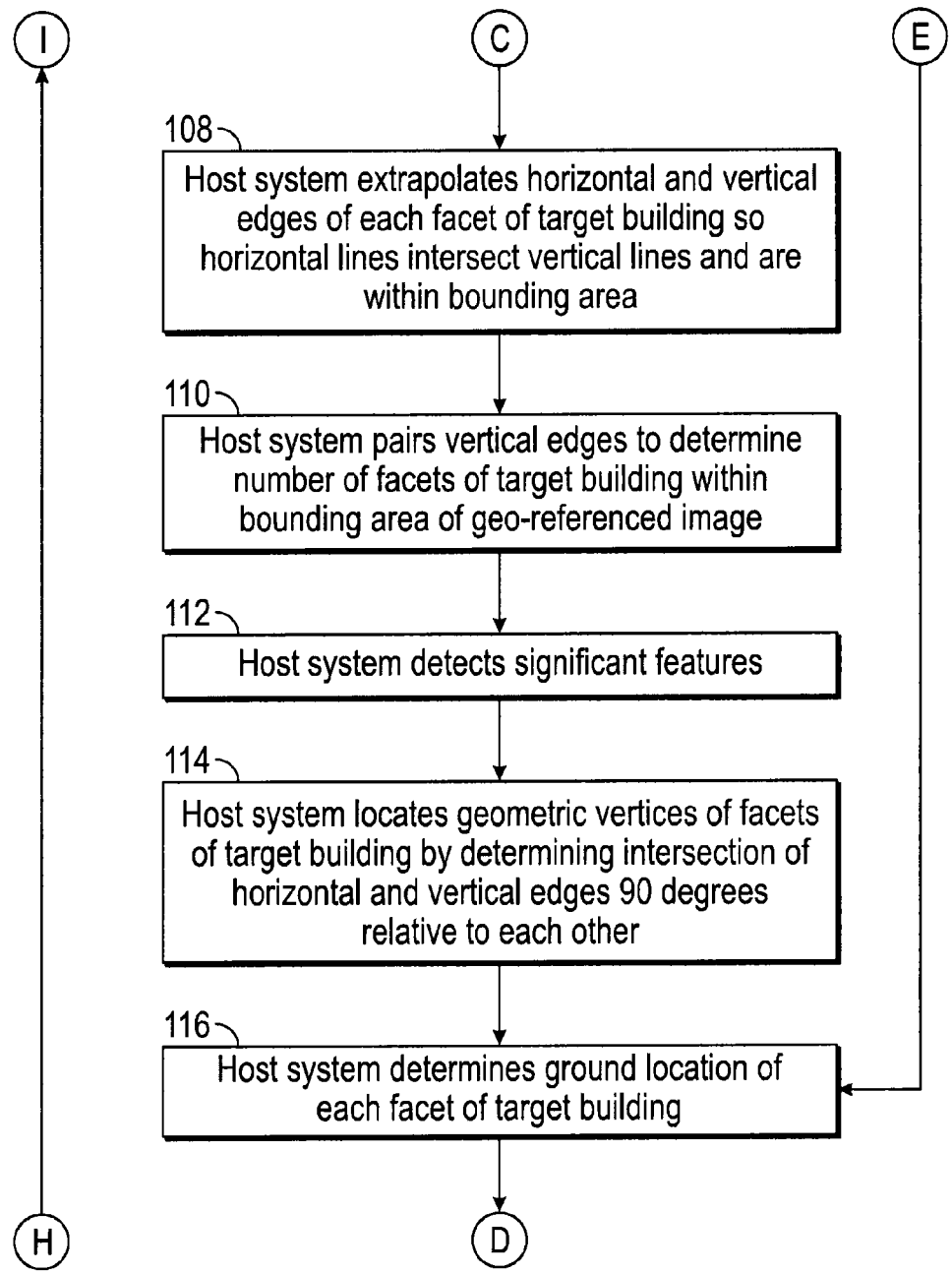
Figure 4:
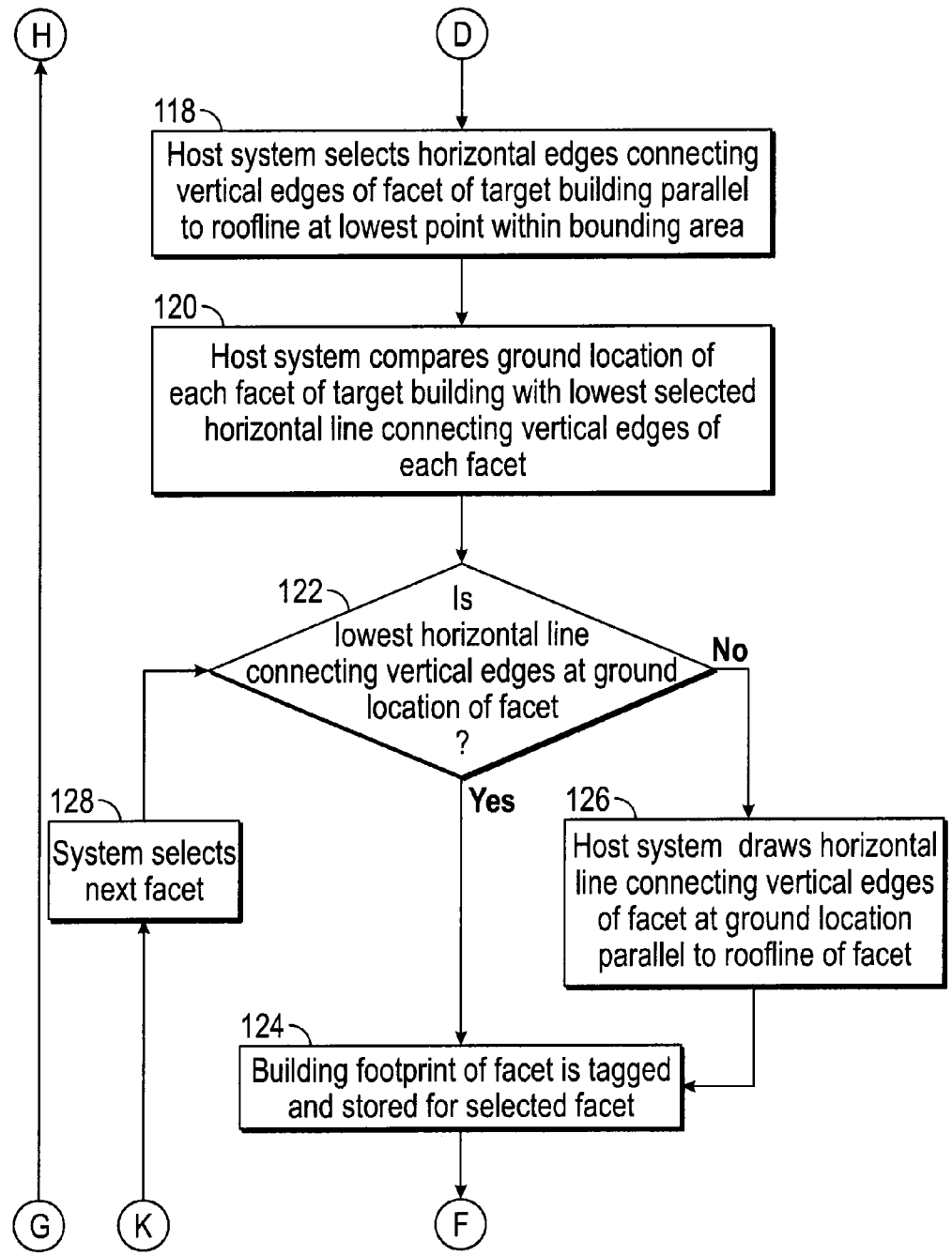
Figure 4:
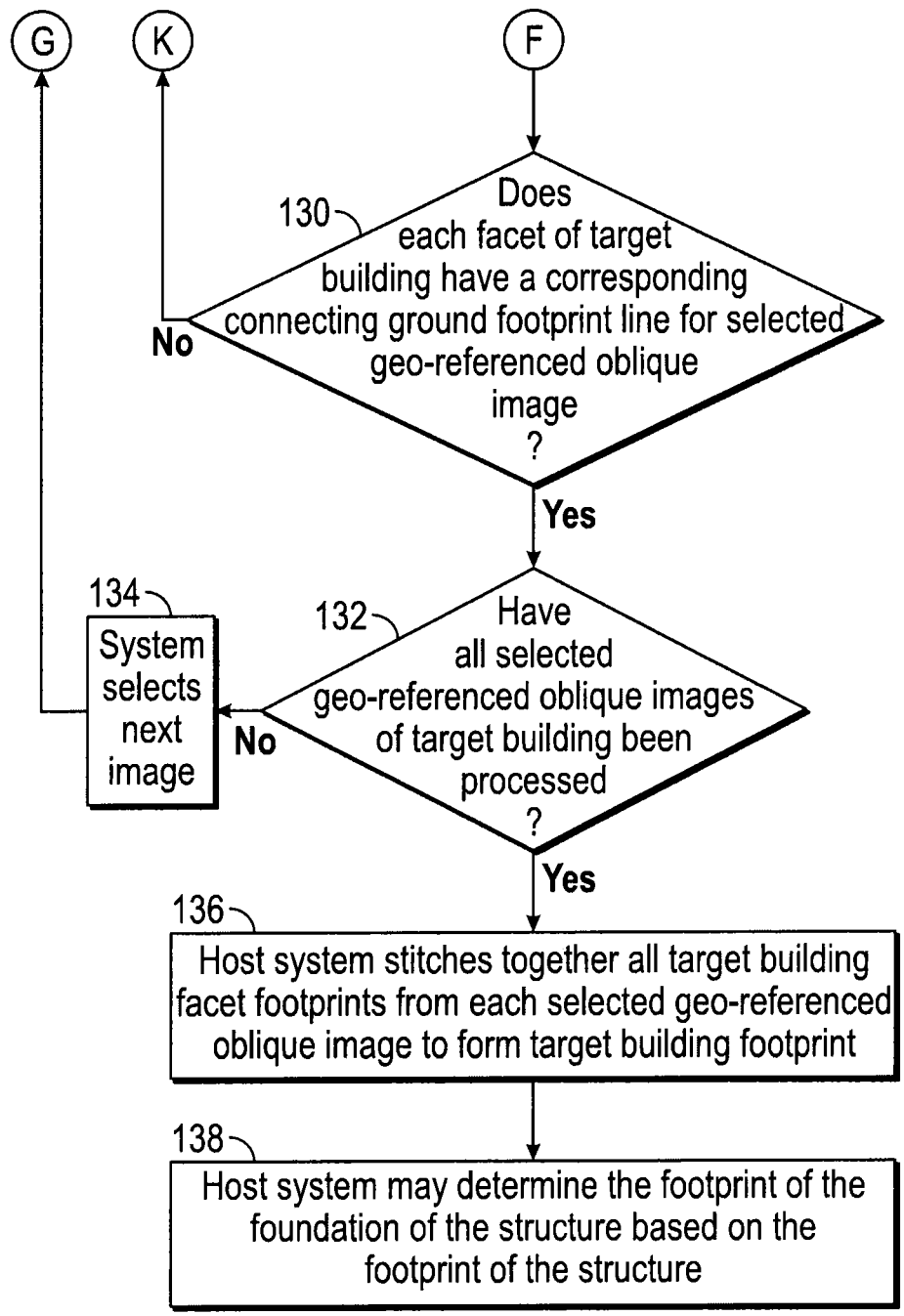

FIG. 4 illustrates a flow chart 70 of an exemplary method for generally detecting one or more physical properties of a structure, such as the structure 102.

In a step 72, a target address for a particular structure may be obtained (e.g., selection on an image, reverse geo-coding an address, performing a parcel database look-up). For example, in some embodiments, a user may input a target address of the property or structure (e.g., the structure 102) in the one of more user devices 14. The terms "property" and "structure" may be used interchangeably with one another and may include a structure 102, along with surrounding land, buildings, structures, or features.

FIG. 4 provides an exemplary detailed method 70 for obtaining a footprint of a foundation of a structure 102 using system and method illustrated in FIGS. 1 and 2. System 10 may be described by way of example utilizing aerial geo-referenced images as the geo-referenced imagery. However, it should be understood that system 10 may use other types of geo-referenced images, such as architectural images. In some embodiments, the methods as described herein may be used in addition to systems and methods as described in U.S. application Ser. No. 61/564,699, which is hereby incorporated by reference in its entirety.

In some embodiments, a user (e.g. customer) may register a user profile with the first host system 12a and/or the second host system 12b. The user profile may be created and/or stored. For example, the user may be prompted by the first host system 12a and/or the second host system 12b to provide login credentials (e.g., username and/or password). Login credentials may allow the first host system 12a and/or the second host system 12b to authenticate the user. The user profile may include information including, but not limited to, demographic information including, but not limited to, name, age, address, billing account information, username, password, behavioral information, experience, gender, and/or the like.

Figure 5:
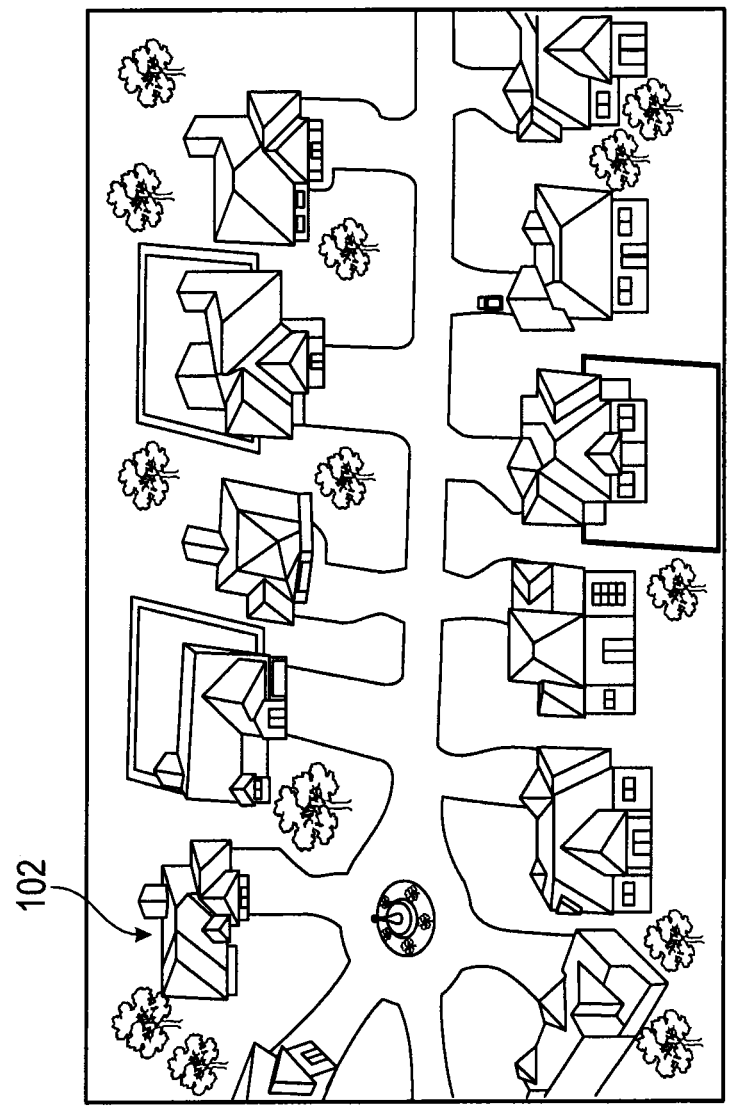
FIG. 5 is a pictorial representation of an image showing an exemplary process for detecting location of a structure.

Referring to FIGS. 4 and 5, in a step 72, a target location may be selected for a building or a structure 102. For example, in some embodiments, a user may input a target location into one or more user devices 14 by clicking on an image, reverse geo-coding an address, performing a parcel database look-up, and/or the like. Alternatively, the system 10 may automatically provide a target location. For example, the first host system 12a and/or the second host system 12b may provide a target location for evaluation without user input.

In a step 74, the first host system 12a and/or the second host system 12b may select one or more images containing the target location. In some embodiments, oblique geo-referenced images may be obtained using oblique aerial imagery as described in U.S. Pat. No. 7,787,659, U.S. Pat. No. 7,873,238, U.S. Pat. No. 7,424,133, and U.S. Pat. No. 5,247,356, all of which are hereby expressly incorporated by reference in their entirety.

Further, geo-referenced images may be obtained using oblique terrestrial imagery. For example, in some embodiments, images may be obtained using oblique terrestrial imagery if the images are capable of being measured upon and/or determined to reveal physical attributes of a structure as described herein.

Geo-referenced images may be images having stored geo-referenced parameters. For example, geo-referenced images and parameters, when combined with a ground plane, (as described in U.S. Pat. No. 7,424,133) may provide a determination of pixel location in real world coordinates (e.g., latitude, longitude) in the geo-referenced image. Measurements may then be made by calculating a difference in pixel location between points of measurement. For example, for distance measurements, calculations may be determined using circle routes and/or across a terrain by tracing a route along a ground plane or between multiple points in a structure. Automated or semi-automated algorithms may be used to determine any of the measurements, and a user or an administrator may review the measurement of the algorithms and accept or edit the measurement, or direct the algorithm to start over, for example.

Referring to FIGS. 1, 4, and 5, in a step 76, the first host system 12a and/or the second host system 12b may display an image of the target location on one or more user devices 14. For example, the target location in FIG. 5 includes the structure 102. In some embodiments, the first host system 12a and/or the second host system 12b may display the image of the target location on one or more output devices 36. In some embodiments, multiple geo-referenced images showing multiple facets of the structure 102 may be provided. For example, geo-referenced images from each cardinal direction (e.g., North, South, East, and West) may be provided for each structure 102.

In some embodiments, the first host system 12a and/or the second host system 12b may use an application (e.g., software application) to evaluate and/or select the one or more geo-referenced images including the target location and/or structure 102. Additionally, in some embodiments, the first host system 12a and/or the second host system 12b may use an application to evaluate and/or select additional geo-referenced images from other cardinal directions. For example, determination of a suitable geo-referenced image for the target location or structure 102 may be made by using methods and systems as described in U.S. patent application Ser. No. 12/221,571, which is hereby incorporated by reference in its entirety. Additionally, in some embodiments, the first host system 12a and/or the second host system 12b may identify one or more structures 102 in the target location through a building detection algorithm.

For example, in a step 80, a user may select the target structure 102 on the image of the target location using one or more user devices 14 and/or input devices 34.

The first host system 12a and/or the second host system 12b may select a geo-referenced image (e.g., orthogonal image) displaying a roof or other physical attribute of the structure 102, as in step 82.

In a step 84, the first host system 12a and/or the second host system 12b may estimate the boundary of the structure 102 from a structure detection algorithm using systems and methods as described in U.S. patent application Ser. No. 12/221,571, which is hereby incorporated by reference in its entirety.

In a step 86, the first host system 12a and/or the second host system 12b may select one or more geo-referenced images (e.g., oblique images) including one or more facets of the structure 102. In some embodiments, at least one image for each Referring to FIG. 8, in a step 102, the first host system 12a and/or the second host system 12b may determine horizontal edges 104 that meet the outermost vertical edges 106. Alternatively, the determination may be for vertical edges 106 that meet the outermost horizontal edges 104.

The first host system 12a and/or the second host system 12b may further determine if multiple facets of the structure 102 exist within the image, as in steps 106-114. In some embodiments, however, the first host system 12a and/or the second host system 12b may skip the determination of multiple facets and proceed to step 116. Determination of facets may be useful in defining property attributes such as windows, siding, eaves, and the like, as will be discussed in further detail herein. Referring to steps 106-114, in determining facets, the first host system 12a and/or the second host system 12b may extrapolate the horizontal edges 104, vertical edges 106, and/or sloped edges 108 of each facet of the structure 102, as in step 108. The first host system 12a and/or the second host system 12b may pair the vertical edges 106 and/or pair the horizontal edges 104 to determine the number of facets of the structure 102 within the boundary area 103 of the image, as in step 110. Property attributes (e.g., significant features) of the structure 102 may be detected, as in step 112. For example, using pairings of horizontal edges 104, vertical edges 106, and/or sloped edges 108, windows may be detected on the structure 102. Additional property attributes may include, but are not limited to, eaves, siding, chimney(s), and/or the like.

Figure 6:
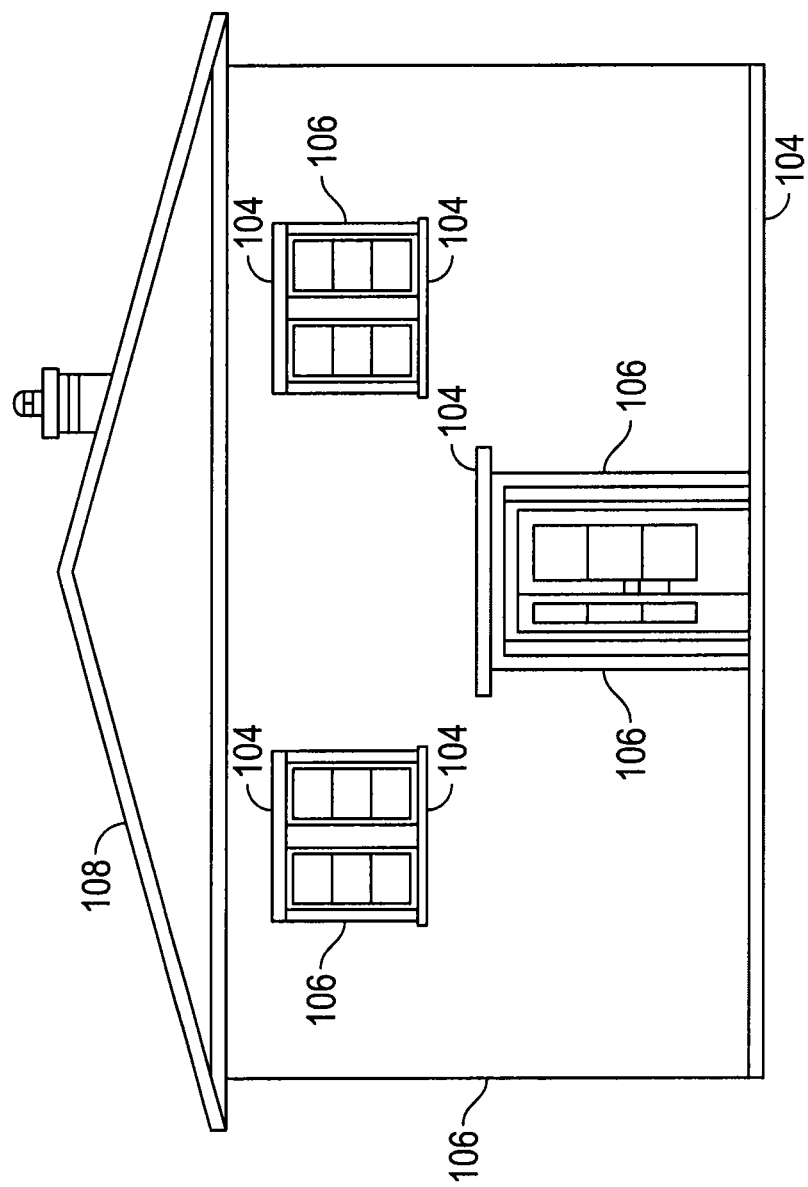
FIGS. 6-8 are simplified pictorial representations showing an exemplary process for defining edges of a structure in accordance with the present disclosure.

In a step 114, the first host system 12a and/or the second host system 12b may locate geometric vertices of each facet of the structure 102. In some embodiments, geometric vertices may be determined by an angle of intersection (θ) cardinal direction may be provided for the structure 102. FIG. 6 illustrates a simplified view of one facet of the structure 102.

The first host system 12a and/or the second host system 12b may run one or more edge detection algorithms on the one or more geo-referenced images of the structure 102, as in step 88. The multiple edge detection algorithms may include an edge detection confidence rating. In a step 90, the first host system 12a and/or the second host system 12b may store in the one or memories 32 the geo-referenced information from the image(s), general information about the image(s), confidence value(s), and/or the like.

The first host system 12a and/or the second host system 12b may compare each edge detection confidence value from each edge detection algorithm, as in step 92. The first host system 12a and/or the second host system 12b may also classify each edge (e.g., "good," "likely," "unlikely," "discard") based on the likeliness to an actual edge of the structure 102, as in step 94.

In a step 96, the first host system 12a and/or the second host system 12b may classify each edge based on orientation. For example, edges may be classified by horizontal edges 104, vertical edges 106, sloped edges 108, and the like.

Figure 7:
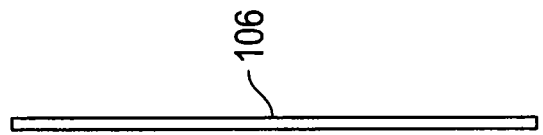
Figure 7:
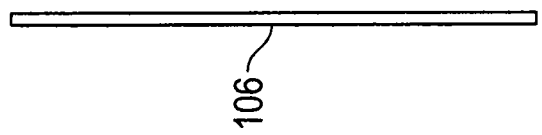

Referring to FIGS. 4-6, the first host system 12a and/or the second host system 12b may compare the detected edges to the boundary area, as in step 98. Detected edges may be limited to those within the boundary area, as in step 100. Additionally, the outermost horizontal edges and the outermost vertical edges may be determined. For example, FIG. 7 illustrates the outermost vertical edges 106 of FIG. 6.

Figure 8:
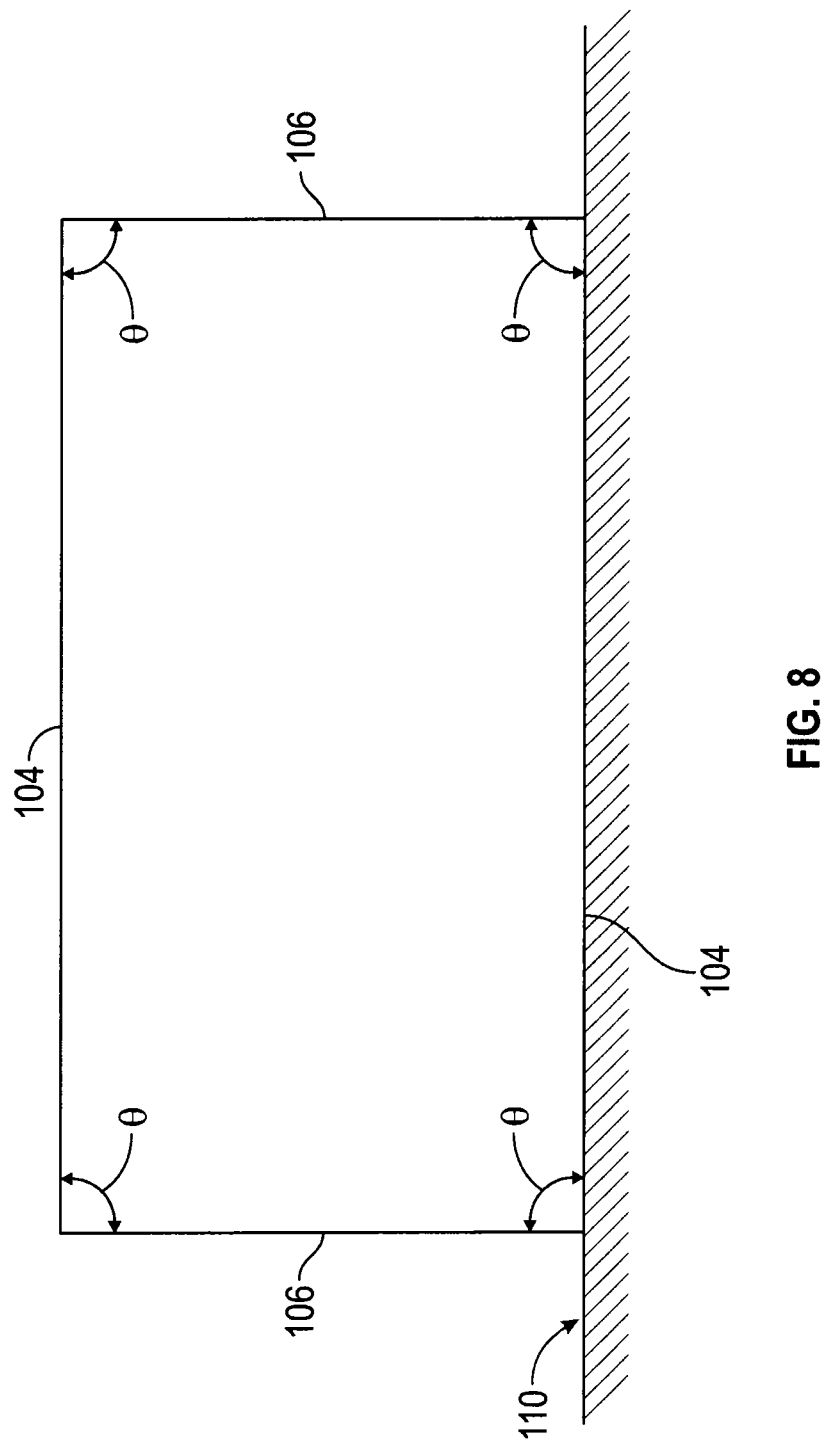

Referring to FIG. 8, in a step 102, the first host system 12a and/or the second host system 12b may determine horizontal edges 104 that meet the outermost vertical edges 106. Alternatively, the determination may be for vertical edges 106 that meet the outermost horizontal edges 104.

The first host system 12a and/or the second host system 12b may further determine if multiple facets of the structure 102 exist within the image, as in steps 106-114. In some embodiments, however, the first host system 12a and/or the second host system 12b may skip the determination of multiple facets and proceed to step 116. Determination of facets may be useful in defining property attributes such as windows, siding, eaves, and the like, as will be discussed in further detail herein. Referring to steps 106-114, in determining facets, the first host system 12a and/or the second host system 12b may extrapolate the horizontal edges 104, vertical edges 106, and/or sloped edges 108 of each facet of the structure 102, as in step 108. The first host system 12a and/or the second host system 12b may pair the vertical edges 106 and/or pair the horizontal edges 104 to determine the number of facets of the structure 102 within the boundary area 103 of the image, as in step 110. Property attributes (e.g., significant features) of the structure 102 may be detected, as in step 112. For example, using pairings of horizontal edges 104, vertical edges 106, and/or sloped edges 108, windows may be detected on the structure 102. Additional property attributes may include, but are not limited to, eaves, siding, chimney(s), and/or the like.

In a step 114, the first host system 12a and/or the second host system 12b may locate geometric vertices of each facet of the structure 102. In some embodiments, geometric vertices may be determined by an angle of intersection (θ) between horizontal edges 104 and vertical edges 106. For example, an intersection may be approximately ninety degrees relative to each other as in FIG. 8.

In a step 116, the first host system 12a and/or the second host system 12b may determine ground location 110 for one or more facets of the structure 102. In a step 118, the first host system 12a and/or the second host system 12b may select horizontal edges 104 that connect to the vertical edges 106 parallel to a roofline at the lowest point within the boundary area 103. In a step 120, the first host system 12a and/or the second host system 12b may compared the ground location 110 with the lowest selected horizontal edge 104 connecting the vertical edge 106 as determined in step 118. If the horizontal edge 104 is determined to be the lowest edge at the ground location 110 or substantially close to the ground location 110, the horizontal edge 104 may be tagged as a portion of the footprint of the structure 102, as in step 124. Alternatively, the first host system 12a and/or the second host system 12b may connect a horizontal line between vertical edges 106 at the ground location 110. For example, the first host system 12a and/or the second host system 12b may connect a horizontal line between vertical edges 106 at the ground location 110 in a position parallel to a roofline of the structure 102, as in step 126. The first host system 12a and/or the second host system 12b may continue to find each horizontal edge 104 at the ground location 110 for the structure as indicated by steps 128 and 130. The first host system 12a and/or the second host system 12b may continue to process each image of the structure 102 as indicated by steps 132 and 134.

Once all horizontal edges 104 of the structure 102 are determined, the first host system 12a and/or the second host system 12b may use the horizontal edges 104 at the ground location 110 to create, provide, and/or store a footprint of the structure 102 as indicated by step 136. The first host system 12a and/or the second host system 12b may then determine the footprint of the foundation of the structure 102 based on the footprint of the structure 102. For example, in some embodiments, the footprint of the structure 102 will be the footprint of the foundation of the structure 102. Alternatively, the footprint of the foundation may include additional portions outside of the range of the footprint of the structure 102 (e.g., additional porch or deck square footage). As such, the first host system 12a and/or the second host system 12b may additionally manipulate the footprint of the structure 102. Such additional manipulation may be pre-assigned and/or user initiated. Automated or semi-automated algorithms may be used to make any of the above determinations and/or measurements, and a user or an administrator may review the determinations and/or measurements of the algorithms and accept or edit the measurement or determination, or direct the algorithm to start over, for example.

While an automated procedure is described herein with reference to FIG. 4, it should be understood that semi-automated procedures may be used for determining measurements, sketches, and/or three-dimensional models. For example, the first host system 12a, the second host system 12b, the one or more input devices 18, and/or the one or more user devices 14, may be included with computer readable instructions stored on one or more non-transient memory that when executed by the one or more processors permit the user to select one or more pixels within one or more displayed images indicative of a location of structure(s), vertices, and/or other displayed features. The first host system 12a and/or the second host system 12b, the one or more input devices 18, and/or the one or more user devices 14 may then calculate a three-dimensional location for the one or more selected pixels. Further, various types of photogrammetry may be used to determine a three-dimensional location of the one or more selected pixels. For example, stereo photogrammetry, single image photogrammetry, and/or the like may be used.

In some exemplary embodiments, the program logic 42 may cause the first host system 12a and the second host system 12b to cooperate with one another to aggregate geo-referenced data and/or to geo-reference and then aggregate data in the database 40 to be used for the various reports as will be described below. Multiple measurements may be collected and stored in the database 40, to be provided to users in the form of a virtual property report provided on a computer screen as a physical property report provided as an electronic file and/or a copy or a printout, for example.

In some embodiments, the program logic 42 may cause the first host system 12a and/or the second host system 12b to aggregate geo-referenced data and/or to geo-reference and then aggregate data in the database 40, and to use such aggregated data for a variety of property reports which may include various compilations of fact-based information aggregated from multiple sources and presented co-incident with geo-referenced metric oblique imagery, for example. The virtual property reports may provide for extensive user interaction and may allow users to determine what metric analysis is included in the report, either when the report is requested, or at any time while viewing the virtual property report, and combinations thereof. For instance, when looking at a property to be insured, the inspector may wish to know how far the structure is from the nearest adjacent structure. The program logic 42 may include an automatic or a semi-automatic (user assisted) method or tools for determining this distance with imagery and/or other data available to the program and recording the facts and including the facts in the subsequently prepared virtual property report(s). Automated or semi-automated algorithms may be used to make any of the determinations and/or measurements described herein, and a user or an administrator may review the determinations and/or measurements of the algorithms and accept or edit the measurement or determination, or direct the algorithm to start over, for example.

As an example, a potential customer may request a cost estimate from a cleaning company to wash the windows of a structure 102. To provide an accurate estimate, the cleaning company may wish to determine how many windows are to be washed, the area of the windows, the height of the windows above the ground, access to the windows (e.g., is there any landscaping or shrubbery that would interfere with the window washing operation), can a ladder be used to reach upper level windows, are there any bay windows or recessed dormer windows, are there insect screens, etc. To that end, the cleaning company may request a window report for a structure 102, which may include the above information about the structure 102, along with any other pertinent information to enable the cleaning company to provide an accurate estimate without physical visitation of the structure 102, for example. Further, the cleaning company may benefit from an additional insight regarding the structure owner's ability to pay, for example, what is the general affluence of the area where the structure 102 is located, what is the assessed tax value of the structure 102, where do the owners work, and what is their work and/or work title (e.g., from social media information), etc. This information may be provided as a virtual or physical property report according to the inventive concepts disclosed herein.

In one exemplary embodiment, virtual or physical property reports according to the inventive concepts disclosed herein may help users determine and document changes that have occurred over time with respect to a particular structure 102, property, or a general area such as a city, a park, a neighborhood, a housing division, a business or office park, etc. The program logic 42 may include processor executable instruction to visually and analytically compare a target structure 102, property, or location at two periods of time. For example, a virtual property report according to the inventive concepts disclosed herein may include a dual-pane or a multi-pane viewer to synchronize viewing the same structure 102 or one or more facets thereof from two different dates. The dual-pane viewer (e.g., a web page or a printout) may include user tools to mark changes, measure differences (area of structure 102 or area of turf grass, etc.). In some embodiments, users may manually note the differences, for example. The host system 12*a* and/or 12*b* may record a user's analysis and may insert such analysis into a virtual property report that documents the work, the sources of information and the results, for example. The virtual property report may include information such as: how much less green space is there now than before, how much taller is the oak tree now than before, did the neighbor have the in-ground pool back in 2005, was that back deck on the house in 2007, and any other measurement and/or property related question that can be determined from geo-referenced imagery, or from other data sources, for example, that is compiled into a database.

Figure 9:
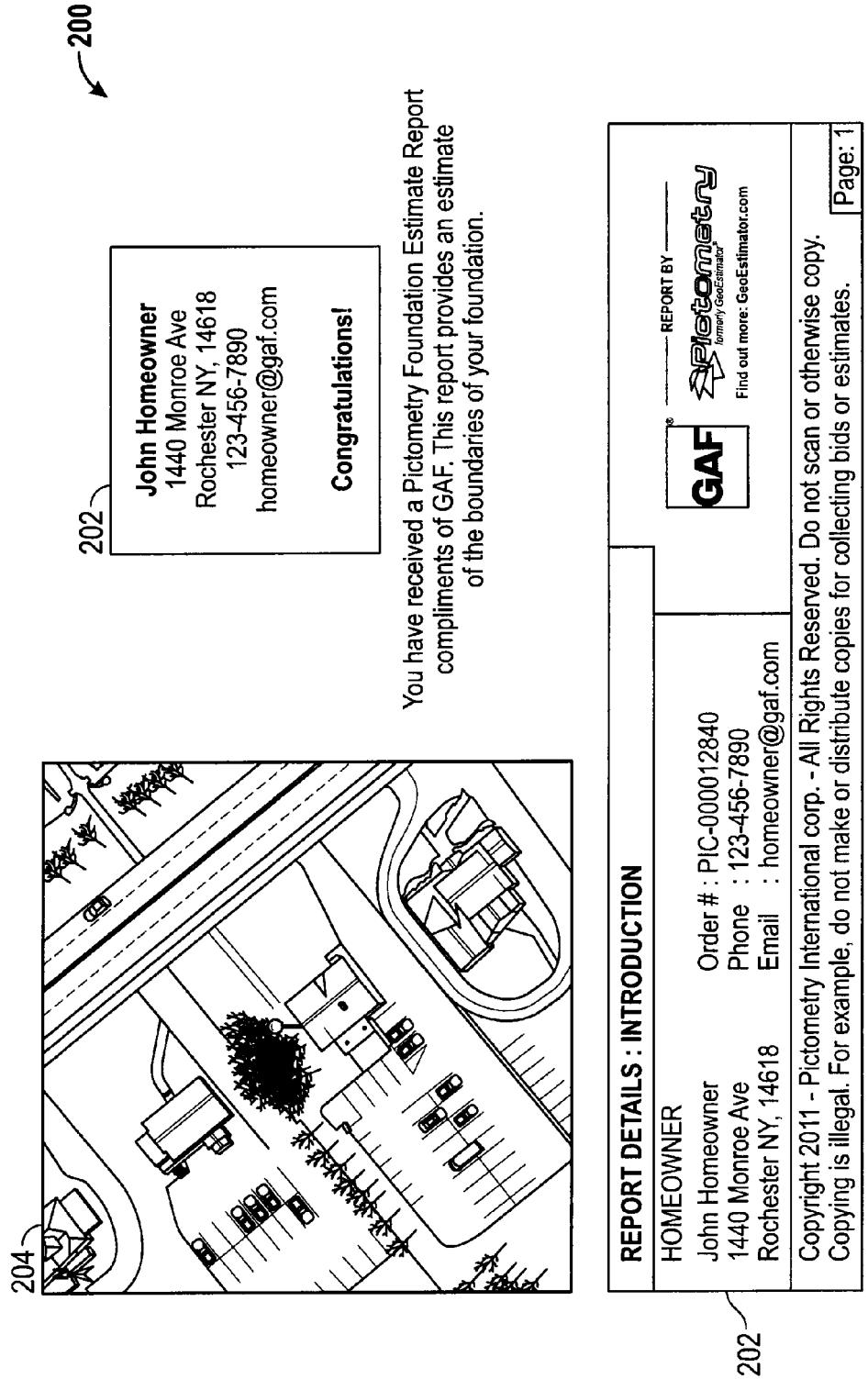
FIG. 9 is an exemplary embodiment of a foundation estimate report presentation page according to the present disclosure.

Referring to FIGS. 1, 4 and 9, in some embodiments, a user may be able to receive a foundation estimate report 200 using the system 10. For example, the user may request an estimate for work on the foundation of the structure 102 using one or more user devices 14. In some embodiments, a user may request an estimate for foundation work using one or more input devices 34 of the first host system 12*a* and/or the second host system 12*b*. The first host system 12*a* and/or the second host system 12*b* may use the method as detailed in FIG. 4 to create, provide, and/or store the footprint of the foundation and/or the dimensions of the foundation for the structure 102. In some embodiments, a user may be able to manipulate results of the method. For example, the user may be able to verify results of the footprint, add additional portions and/or details, and/or remove portions from consideration.

The first host system 12*a* and/or the second host system 12*b* may provide a report to the user for the foundation work to be performed on the structure 102. For example, FIG. 9 illustrates an exemplary foundation estimate report 200. The foundation estimate report 200 may be distributed using the first host system 12*a* and/or the second host system 12*b* to the one or more user devices 14 and/or input devices 34. In some embodiments, the report 200 may be distributed to a third party system in addition to, or in lieu of, the user. For example, if the user is a homeowner, the report 200 may be distributed to the customer and/or to a third party system such as a material supplier, insurance company, real estate agency, home service company, cleaning company, auditing company, contractors, or the like. As used herein "agency" is intended to include an individual, a group of individuals, a commercial or charity organization or enterprise, a legal entity (e.g., a corporation), an organization whether governmental or private, and combinations thereof.

The foundation estimate report 200 may include data sets such as customer information 202, foundation information 204, estimated area detail 206, and contractor information 208.

The customer information data set 202 may include the customer name, customer contact information, and/or the like. The foundation information data set 204 may include one or more images of the structure 102. The estimated area detail data set 206 may include the total estimated square footage of the foundation as determined using the system 10 as described herein.

The contractor data set 208 may include one or more contractor names and/or associated contractor contact information. For example, the contractor data set 208 may comprise information about building contractors within a given geographic location. Each contractor may be associated with a contractor profile having information including, but not limited to, business name, contractor owner name, address, experience level, specialties performed, insurance coverage, age of contractor business, review, or ranking information, and/or the like. For example, the contractor data set 208 may include review information. The review or ranking information may include positive and/or negative feedback relating to each contractor. For example, the review or ranking information may be based on prior customer feedback of customers using the system 10. Review information may also be obtained from one or more outside databases (e.g., Yelp, Google review, and/or the like).

In some embodiments, contractors may self-register information with the first host system 12*a* and/or the second host system 12*b*. For example, a contractor may set-up a contractor profile within the first host system 12*a* and/or the second host system 12*b*. The contractor profile may have information including, but not limited to, business name, contractor owner name, address, experience level, age of contractor business, review information, and/or the like.

In some embodiments, additional data sets may be included within the foundation estimate report 200. For example, data sets may include, but are not limited to, weather data, insurance/valuation data, census data, school district data, real estate data, and/or the like.

Weather data sets may be created, provided, and/or stored by one or more databases storing information associated with weather (e.g., inclement weather). A weather data set within the foundation estimate report 200 may include, but is not limited to, hail history information and/or location, wind data, severe thunderstorm data, hurricane data, tornado data, flooding data, and/or the like. In some embodiments, the one or more databases including weather information may be hosted by a separate system (e.g., LiveHailMap.com) and contribute information to the first host system 12*a* and/or the second host system 12*b*. In some embodiments, the separate system (e.g., LiveHailMap.com) may be one or the first host system 12*a* or the second host system 12*b*. The weather data set may be included within the foundation estimate report 200 and provided to the user and/or other parties.

Insurance and/or valuation data sets may be created, provided, and/or stored by one or more databases storing information associated with property insurance and/or valuation. An insurance and/or valuation data set may include, but is not limited to, insured value of the home, insurance premium amounts, type of residence (e.g., multi-family, single family), number of floors (e.g., multi-floor, single-floor) building type, location relative to recognized hazard zones (wind, hail, flood, etc.), eligibility for special insurance coverage (flood, storm surge), and/or the like. The location relative to recognized hazard zones may be measured using a walk-the-Earth feature along ground planes as described in U.S. Pat. Nos. 7,424,133 and 8,233,666, for example. Automated or semi-automated algorithms may be used to make any of the determinations and/or measurements, and a user or an administrator may review the determinations and/or measurements of the algorithms and accept or edit the measurement or determination, or direct the algorithm to start over, for example.

In some embodiments, the one or more databases may be hosted by a separate system (e.g., Bluebook, MSB, 360Value), and contribute information to the first host system 12*a* and/or the second host system 12*b*. In some embodiments, the one or more databases may be included in the first host system 12*a* and/or the second host system 12*b*.

The insurance and/or valuation data set(s) may be included within the foundation estimate report 200 and provided to the user and/or other parties. For example, during underwriting of a home, an insurance company may request the foundation estimate report 200 on a home that is recently purchased. The information within the foundation estimate report 200 may be integrated with insurance information from an insurance database and used to form a quote report. The insurance and/or valuation data may be sent to the user and/or to the insurance company as part of the foundation estimate report 200, or separately, for example. Alternatively, the report 200 may be solely sent to the insurance company with the insurance company using the information to formulate an insurance quote.

In another example, the report 200 may be used in an insurance claim. In the case of a property damage and/or loss of a customer, one or more databases may be used to create, provide, and/or store an insurance dataset with claim information in the report 200. For example, an insurance database having a policy in force (PIF) and a weather database may be used to correlate information regarding an insurance claim for a particular roof. This information may be provided within the report 200.

Real estate and/or census data sets may also be included within the one or more of the reports described herein, such as the report 200. The real estate and/or census data sets may be created and stored in one or more databases having detailed information of the structure 102. For example, a real estate data set may include, but is not limited to, the homeowner's name, the purchase price of the home, the number of times the home has been on the market, the number of days the home has been on the market, the lot size, the rental history, number of bedrooms, number of bathrooms, fireplaces, swimming pools, hot tubs, and/or the like.

Real estate assessment information may also be included within the real estate data set. Real estate assessment information may include, but is not limited to, one or more tools for locating comparable properties to the structure 102, tax assessments of similar valued properties, old photos of the structure 102 and/or adjacent areas, history of the property title (e.g., abstract), prior sales, prior owners, rental history, and/or the like.

The census data set may include information regarding the number of residents within the home or structure 102, names and addresses of neighborhood or community residents and/or companies, ages of the surrounding population, gender of the surrounding population, occupations of the surrounding population, income level of the surrounding population, public personas, social media information of neighbors (e.g., social media identities of neighbors, social media friends, followers, or connections of neighbors, or other social media profile information of neighbors, such as pets, favorite music and movies, social organization membership, hobbies, favorite sports and sport teams, relationship status, recent social media posts or status updates, work, profession, work title, etc.), presence of convicted felons, sex offender identification, and/or the like. In some embodiments, the one or more databases 40 may be hosted by a separate system (e.g., Core Logic) and contribute information to the first host system 12*a* and/or the second host system 12*b* to provide data sets as described herein. Alternatively, the one or more databases 40 may be integrated within the first host system 12*a* or the second host system 12*b*.

In some embodiments, the first host system 12*a* and/or the second host system 12*b* may include logic and/or computer executable instructions to determine and/or store one or more physical attributes of the structure 102. Physical attributes of the structure 102 may include, but are not limited to, the number and/or dimensions or areas of windows of the structure 102, the number and/or dimensions of doors, the amount and/or percentage of building materials (e.g., siding, stone, and/or the like), the dimension of attributes associated with the structure 102 (e.g., height of eaves, height and/or dimension of chimney(s), and/or the like), and/or the like. Physical attributes may include any attribute that may be measured or estimated or calculated by measuring distances between the X, Y, and Z locations of the geometric vertices and/or selected points by analyzing an aerial or terrestrial image with computerized methodologies as described herein. Automated or semi-automated algorithms may be used to make any of the determinations and/or measurements described herein, and a user or an administrator may review the determinations and/or measurements of the algorithms and accept or edit the measurement or determination, or direct the algorithm to start over, for example.

In some embodiments, the first host system 12*a* and/or the second host system 12*b* may determine the number and/or dimensions or area of windows of the structure 102. For example, referring to FIGS. 1 and 4, in step 108 the first host system 12*a* and/or the second host system 12*b* may extrapolate horizontal edges 104, vertical edges 106, and/or sloped edges 108 for each facet of a structure 102. Horizontal edges 104 may be paired, vertical edges 106 may be paired, and/or sloped edges 108 may be paired as in step 110. Pairing of edges may include an overview of significant features (e.g., physical attributes), such as windows of the structure 102. The first host system 12*a* and/or the second host system 12*b* may then locate geometric vertices of the horizontal edges 104, vertical edges 106, and/or sloped edges 108, to outline one or more windows of the structure 102. Dimensions of the one or more windows may be determined by measuring distances between the X, Y, and Z locations of the geometric vertices and/or selected points by analyzing the image data as discussed above, and/or within a separate image. Area of the windows may be determined from the dimensions of the windows, for example. The X, Y, and Z locations may be determined with the techniques described in U.S. Pat. No. 7,424,133, for example.

Figure 10:
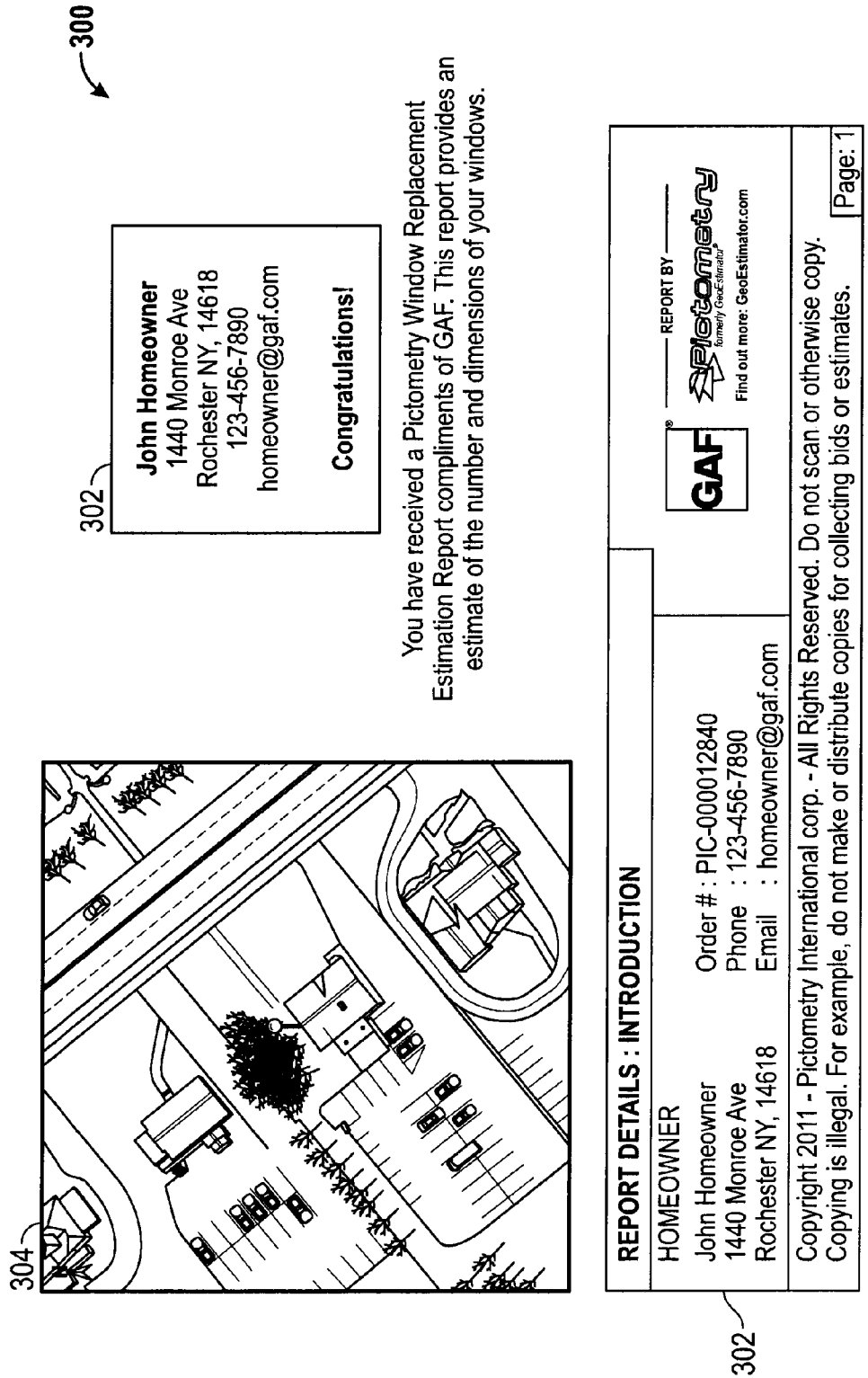
FIG. 10 is an exemplary embodiment of a window replacement estimate report presentation page according to the present disclosure.

Referring to FIGS. 1, 4 and 10, a user may be able to receive a window replacement estimate report 300 using the system 10. For example, the user may request an estimate for window replacement of the structure 102 using one or more user devices 14. In some embodiments, a user may request an estimate for window replacement using one or more input devices 34 of the first host system 12*a* and/or the second host system 12*b*. The first host system 12*a* and/or the second host system 12*b* may use the methods as detailed in FIG. 4 to create, provide, and/or store the number and/or dimensions of the windows for the structure 102. In some embodiments, a user may be able to manipulate results of the method. For example, the user may be able to use the user device 14 to select the location of the geometric vertices of the windows to verify windows, remove windows, and/or add windows for consideration.

The first host system 12a and/or the second host system 12b may provide the report 300 to the user for the window estimation. For example, FIG. 10 illustrates an exemplary window replacement estimate report 300. The window replacement estimate report 300 may be distributed using the first host system 12a and/or the second host system 12b to the one or more user devices 14 and/or input devices 34. In some embodiments, the report 300 may be distributed to a third party system in addition to, or in lieu of, the user. For example, if the user is a homeowner, the report 300 may be distributed to the customer and/or to a third party system such as a material supplier, insurance company, real estate agency, home service company, cleaning company, auditing company, contractors, or the like.

The window replacement estimate report 300 may include data sets such as customer information 302, structure information 304, estimated number and/or area detail 306, and contractor information 308.

The customer information data set 302 may include the customer name, customer contact information, and/or the like. The structure information data set 304 may include one or more images of the structure 102. The estimated number and/or area detail data set 306 may provide the total estimated number and/or dimensions of one or more window of the structure as determined using the system 10 as described herein. The contractor data set 308 may include one or more contractor names and/or associated contractor contact information.

In some embodiments, additional data sets may be included within the window replacement estimate report 300. For example, data sets may include, but are not limited to, weather data, insurance/valuation data, census data, school district data, real estate data, and/or the like as described herein. For example, in some embodiments, the window replacement estimate report 300 may be used in an insurance claim. In the case of property damage or loss of a customer, the first host system 12a and/or the second host system 12b may be used to create, provide, and/or store an insurance dataset with claim information in the window replacement estimate report 300. For example, an insurance database having a policy in force (PIF) and a weather database may be used to correlate information regarding an insurance claim for a particular structure 102 with windows. This information may be provided within the window replacement estimate report 300.

In some embodiments, system 10 may be used to generate a siding replacement estimate report. The siding replacement estimate report may be similar to the foundation estimate report 200 and the window replacement estimate report 300 described herein. In preparing the siding replacement estimate report, the first host system 12a and/or the second host system 12b may determine the dimensions of siding used on the exterior of the structure 102 including but not limited to dimensions and/or areas of distinct sections of the exterior of the structure 102, and cumulative area of different distinct sections. Referring to FIGS. 1 and 4, in step 108 the first host system 12a and/or the second host system 12b may extrapolate horizontal edges 104, vertical edges 106, and/or sloped edges 108 for each distinct facet of the structure 102. Horizontal edges 104 may be paired, vertical edges 106 may be paired, and/or sloped edges 108 may be paired as in step 110. Pairing of edges may reveal an overview of significant features (e.g., physical attributes), such as the dimensions and/or amount of siding on the exterior of the structure 102. The first host system 12a and/or the second host system 12b may then locate geometric vertices of the horizontal edges 104, vertical edges 106, and/or sloped edges 108 to outline the dimensions of the siding of the structure 102. Dimensions of the siding may be determined using analysis of the dimensions of one or more walls of the structure 102 within the image, and/or within one or more separate images showing different parts of the structure 102. In some embodiments the area of a wall of the structure 102 may be substantially the same as the area of the siding, while in some exemplary embodiment, the area of the siding may be smaller than the area of the wall of the structure 102.

In some embodiments, a user may be able to receive a siding replacement estimate report similar to the foundation estimate report 200 and/or the window replacement estimate report 300 of FIGS. 9 and 10. The siding replacement estimate report may include data sets, including, but not limited to, customer information, structure information, estimate details including type, area, and price of siding, contractor information, and/or the like. In some embodiments, additional data sets may be included within the siding replacement estimate report. For example, data sets may include, but are not limited to, weather data, insurance/valuation data, census data, school district data, real estate data, and/or the like as described herein.

In some embodiments, system 10 may be used to generate a roofing report. The roofing report may be similar to the foundation estimate report 200 and the window replacement estimate report 300 described herein.

Referring to FIGS. 1 and 4, the first host system 12a and/or the second host system 12b may determine the height of eaves of the structure 102. For example, in step 108 the first host system 12a and/or the second host system 12b may extrapolate horizontal edges 104, vertical edges 106, and/or sloped edges 108 for each facet of a structure 102. The first host system 12a and/or the second host system 12b may then determine horizontal edges 104 located at the peak of the structure 102 using the methods described in FIG. 4, to determine the location and dimensions of the eaves of the structure 102. In some embodiments, eaves location may be determine using the systems and methods as described in U.S. patent application Ser. No. 12/909,692, which is hereby incorporated by reference in its entirety. The height of the eaves of the structure 102 may then be determined by approximating the distance from a ground level. For example, the height of the eaves of the structure 102 may be determined by using a single image and a ground plane as described in U.S. Pat. Nos. 7,424,133 and 8,233,666, which are hereby incorporated by reference in their entirety. Other techniques, such as aero triangulation using overlapping images, may also be used.

In addition to, or in lieu of the height of the eaves, the pitch of the roof may be included within a report. In some embodiments, the pitch of the roof may be determined using systems and methods as described in U.S. Ser. No. 13/424,054, which is hereby incorporated by reference in its entirety.

In some embodiments, the system 10 may be used to generate a chimney report. The chimney report may be similar to the foundation estimate report 200 and the window replacement estimate report 300 described herein.

Generally, the first host system 12a and/or the second host system 12b may determine the number and dimensions (e.g., height, width, length, and area) of one or more chimneys of the structure 102. For example, referring to FIGS. 1 and 4, in step 108 the first host system 12a and/or the second host system 12b may extrapolate horizontal edges 104, vertical edges 106, and/or sloped edges 108 for each facet of a structure 102. The first host system 12a and/or the second host system 12b may then determine pairings of vertical edges 106 rising towards and past the peak of the structure 102 using the methods described in FIG. 4, to determine the location and dimensions of the one or more chimneys of the structure 102. The number and dimensions of the one or more chimneys may be provided in a report similar to the foundation estimate report 200 and/or the window replacement report 300. For example, a report may be provided for a customer requesting cleaning of one or more chimneys, demolition of one or more chimneys, and/or the like. Alternatively, a report (including any of the reports described herein) may be provided to a property tax assessor, insurance agency, real estate agency, and/or the like, informing of the number and dimensions of one or more chimneys of the structure 102.

The methods as described and illustrated in FIG. 4 create, provide and/or store an outline the structure 102 preferably including one or more physical attributes of the structure 102 (e.g., windows, doors, chimneys, siding, eaves, and/or the like). As such, a sketch of the structure 102 may be provided in some embodiments. The sketch may be used as an image of the structure 102 within many industries including, but not limited to, building contractor companies, real estate agencies, weather agencies, community agencies, home maintenance companies (e.g., gardeners, maid services, window washers, pool maintenance companies, and/or the like), federal agencies, state agencies, municipal agencies, schools, religious agencies, sport and recreation organizations, insurance agencies, historical commissions, utility agencies (e.g., water, gas, electric, sewer, phone, cable, internet, and/or the like), commercial agencies (e.g., grocery stores, big box stores, malls, restaurants, gas/auto service stations, and/or the like), news agencies, travel agencies, mapping agencies, and/or the like.

In some embodiments, the sketch may include a three-dimensional model. The three-dimensional model may be the basis of a virtual property model containing not only information about the exterior of the structure 102, but may also include further information including, but not limited to, room layout, living areas, roof layout, and/or the like. Such information may be included in the real estate arena and/or building arena. For example, multiple data sources may be attached to the model to include bids for remodeling and/or the like. Some examples may be found in European Application No. 99123877.5, which is hereby incorporated by reference in its entirety.

In some embodiments, the sketch, three-dimensional model, and/or additional information may be used to acquire or to apply for any building permits and/or variances (e.g., zoning variances, fence building permits, water well digging permits, septic system construction permits, pool construction permits, etc.), for example. The sketch or model of the structure may be transmitted or otherwise provided to a permit-issuing agency as a part of a permit request (e.g., as a permit request report or request), to allow the permit-issuing agency to process the permit request without having personnel go out to the physical location of the structure 102, or by allowing personnel to defer or delay a site visit, or to avoid a phone call or substantially obviate the need for the permit requesters to submit additional information, for example. In some exemplary embodiments, the permit requester may annotate an image or sketch of the structure to show requested changes or structures to be built or removed, geo-referenced location of visible or underground utilities, compliance with zoning codes, fire codes, geo-referenced property boundaries, and any other relevant annotations to enable the permit-issuing agency to evaluate the permit request without physical visitation to the structure 102, for example. As will be appreciated by persons of ordinary skill in the art, an annotated permit or variance application according to the inventive concepts disclosed herein includes substantially precise geo-referenced locations of proposed features to be added to or removed from the property and/or the structure 102. Such geo-referenced location may show the actual location of the features, thus enabling the permit board, variance board, or zoning board members to consider and decide on the application by virtually visiting the structure 102, and without physically visiting the structure 102 as is the current practice of such boards. In this example, the sketch, three-dimensional model, or the like, can be prepared by a first user of the system and then transmitted to a second user of the system. The first user can be the permit requester, for example, and the second user can be a person(s) working at the permit-issuing agency.

In some embodiments, for example within the real estate industry, the sketch and/or three-dimensional model of the structure 102 may be used as a virtual tour for prospective buyers. The models may be obtained using the techniques as described herein. Additional information and/or photographs of the interior of the structure 102 may be used to model the interior of the structure 102 and used to create, provide, and/or store a virtual tour of the structure 102.

The methods, as described and illustrated in FIG. 4, may also apply to areas about the structure 102. For example, property about the structure 102 may be analyzed using the system 10 and techniques described herein. Such property attributes and/or land attributes may include, but are not limited to, size (e.g., acreage) of the property, dimensions of the property, easements and/or rights of way on the property, flood zone of the property, proximity to major roadways, proximity to railways, and/or the like. Alternatively, property or structure 102 attributes may be determined using a third party source and/or stored within the first host system 12a and/or the second host system 12b. Such property attributes may be added into information by the methods described herein. For example, acreage of property associated with the structure 102 may be added into one or more reports as described herein. In another example, the sketch may include locations of the structure 102 in relation to property attributes (e.g., easements, rights of way, dimensions of the property, flood zones, and/or the like).

Information regarding the structure 102 and/or the property, as described herein, may be used to create, provide, and/or store information and/or reports within the home maintenance arena. For example, the methods and systems as described herein may provide information regarding the dimensions of one or more areas of turf on the property of the structure 102 (e.g., front yard, back yard, side yard, mulch beds, flower beds, gardens, and the like), the dimensions of one or more gardens, the area and/or dimensions of one or more trees, the shade pattern of one or more trees, the actual X, Y, Z location of where a tree trunk intersects the ground, the height of a tree, the shade pattern of a tree (e.g., displayed as darkened lines and/or areas), the dimensions and area of one or more driveways, the number and area of windows, the dimensions of one or more gutters, the dimensions and/or depth of one or more pools (or height of above-ground pools), the dimensions of one or more decks (e.g., whether the decks are single-level, or multi-level, and the height, dimensions, and area of each level, including the height and length of deck railing), and/or the like. Such attributes may be generated by receiving a selection of one or more pixels in a displayed image and transforming the pixel coordinate(s) within the image to real-world geographic coordinates, and then further associating data such as labels or the like to the real world coordinates. The attributes may be added into information or virtual property reports described herein and/or provided in a single report using the methods described herein. For example, a report may be generated by a landscaping agency to include an estimate for lawn or landscaping maintenance. A first user (e.g., homeowner) may request a lawn maintenance estimate using user devices 14, and a second user of the landscaping agency may (1) create, (2) provide, and/or (3) store the measurement data in a database with a geographic indicator, such as an address, and then (4) generate a report using one of the user devices 14 and/or the first host system 12*a* and/or the second host system 12*b* as described herein. Such report may be generated without physical visitation of personnel of the landscaping agency to the structure 102. In addition, the measurement data may be addressed and/or accessed by a user using a program, such as a database program or a spreadsheet program. In addition, the measurement data can be saved as a digital worksheet (e.g., Microsoft Excel) file or an XML file, for example.

Construction information regarding the structure 102 and/or property may also be included in one or more reports, such as a virtual property report as described herein. For example, construction information may include, but is not limited to, size and slope of the roof, size and slope of the driveway, bearing of the driveway, shade patterns from adjacent structures and/or trees, and/or the like. Such information may be obtained using the methods as described in FIG. 4. For example, shade patterns of structures and/or trees may include lines within an image (e.g., darkened areas). The height of trees and the location where the tree trunk intersects the ground may be determined by suitable computational measurement technique, or correlating pixel coordinates to real-world coordinates, and may be included in the report. The footprint of the area may be determined by the darkened areas of the image. As such, the shade pattern may be created, provided, and/or stored using the first host system 12*a* and/or the second host system 12*b* as described herein. Shade information, in some embodiments, may include estimations for solar energy orientation and/or potentials. For example, a solar energy estimation report may be created, provided, and/or stored using the footprint of the area of the shade pattern. The report may be similar to the footprint estimation report 200 and/or the window replacement estimate report 300.

In some embodiments, information obtained by using the methods as described herein may be used by municipalities, users within the municipality, and/or users seeking information regarding structures 102 and/or land within the municipality. For example, using the methods of FIG. 4, boundaries (e.g., footprints) may be determined for counties, schools, cities, parks, churches (location and denominations), trails, public transit lines, and/or the like. Additionally, three dimensional models and/or sketches may be created, provided, and/or stored for such counties, schools, cities, parks, trails, youth sports facilities, public swimming pools, libraries, hospitals, law enforcement, hospitals, fire stations, and/or the like. In some embodiments, the models and/or sketches may provide viewings of structures 102 and/or physical attributes of land surrounding the properties. Also, distance between structures 102 may be estimated using techniques as described herein and may be measured along ground planes as described in U.S. Pat. Nos. 7,424,133 and 8,233,666, for example. As such, location and/or distances between municipal facilities may be provided to a user.

In one example, school or school zone boundaries may be determined using modeling of structures (e.g., 2-dimensional and/or 3-dimensional) within the municipality. Modeling of structures may include an estimation of dimensions, number of structures 102, and/or the like. This information may be used to determine feasibility of altering school boundaries, feasibility in adding one or more schools and/or school systems, reporting of existing school boundaries, and/or the like.

In another example, zoning ordinances may be determined and/or enforced using structure modeling. For example, a homeowner may build a specific structure (e.g., pool), and report or file with the city certain dimensions subject to the zoning ordinances of the municipality. Using the systems and methods as described herein, the municipality may be able to view the pool and measure dimensions of the pool (e.g., size, orientation, or depth for aboveground pools) for compliance without physical visitation to the structure 102.

In some embodiments, municipal rendering may include mapping for special districts within a municipality. For example, obtaining footprints, models, and/or sketches of structures 102 may aid in grouping of structures 102 for fire and public protection. Using the methods as described herein, measurements may be included for each structure 102 and land surrounding the structures 102 such that distance measurements may be obtained and used to create, provide, and/or store mapping for such special districts (e.g., fire, public protection, congressional districts, electoral districts, and the like). Distance measurements may be determined along ground planes as described in U.S. Pat. Nos. 7,424,133 and 8,233,666, for example.

In one example, an election report may be generated using mapping of the municipality. The election report may include information including, but not limited to, officials within one or more districts (e.g., local, county, state and/or federal officials) demographics of the one or more districts, distance of a point of interest to the one or more districts, location of municipal facilities, polling locations, distance to polling locations from a point of interest, images of polling locations, and/or the like. The election report may be similar to the foundation estimate report 200 and the window replacement report 300.

In one example, mapping structures 102 and land using the methods described herein may be used to create and/or electronically store in one or more databases 40 one or more models for sewer, lighting, and/or other public works. For example, mapping structures 102 and land may be used to create, provide, and/or store a three-dimensional model with associated dimensions. The three-dimensional model with associated dimensions may be used to plan for additional sewage lines and/or replacement/removal of sewage lines, in one example. With mapping, an estimation regarding feasibility, building materials, and/or the like may be created, provided, and/or stored prior to physical visitation to the area (e.g., structure and/or land).

Information regarding utility connections and services may also be used to create, provide, and/or store a utility report using the systems and methods as described herein. For example, utility connections may be a physical attribute of a structure 102 identified using methods described herein. As such, the location of visible utility connections may be made. Additionally, the location of hidden utility services may be identified using structures and land analysis in conjunction within one or more databases having hidden utility location information. In some embodiments, hidden utility services may be determined solely using identification of physical attributes on the land and/or structures. For example, using the system and methods as described herein, physical attributes including, but not limited to, water shut off valves, sewer shut off valves, utility lines, meters, manhole covers, drains, overhanging lines, poles, and/or the like, may be identified and/or measured. From these physical attributes, hidden utility lines may be identified using the image and techniques described herein, including, but not limited to, gas, electric, sewer, water, phone, cable, internet, and/or the like. In some embodiment, additional information about the utility lines may be identified and stored in the database 40 by modeling and/or use of one or more outside databases. For example, the grade, size, capacity, and/or consumption of utility lines may be determined by the systems and methods as described herein, and/or included by one or more databases 40.

Using the methods as described in FIG. 4, for example, distance between structures 102 and/or land may be determined. Using this information, distance between structures 102 and/or land may be used in applications including, but not limited to, driving and/or commute time between places of interest, distances between and/or to retail environments (e.g., grocery stores, big box stores, malls, restaurants, gas/auto service stations), distance to hospitals, distance and/or time for fire and/or emergency response, distance between schools (e.g., zoning, boundaries), distance between churches (e.g., by denomination), and the like. Such distances may be provided to the user using the user device 14.

In one example, an emergency service report may be created and provided to a user. The emergency service report may include, but is not limited to, distance from a point of interest to one or more hospitals, distance for fire, ambulance, and/or police response to a point of interest, the type of law enforcement within a geographic area surrounding the point of interest, and/or the like. The emergency service report may be incorporated into any of the previous reports described herein or transmitted or provided as a standalone report. For example, the emergency service report may be similar to the foundation estimate report 200 and the window replacement report 300.

In one example, distances between churches (e.g., by denomination) may be measured and provided to a user. For example, system 10 may provide a church report including, but not limited to, locations of one or more churches, denominations of the one or more churches, distance from a point of interest to the one or more churches (e.g., user's residence), zonal boundaries of churches (e.g., parish boundaries), photos of the one or more churches, and/or the like. The church report may be similar to the foundation estimate report 200 and the window replacement estimate report 300.

Similarly, system 10 may provide a school report similar to the church report. The school report may include, but is not limited to, locations of one or more schools, age range of the one or more schools, ratings of the one or more schools, photos of the one or more schools, zonal boundaries of the one or more schools, and/or the like. Similar reports may be provided for parks, sports centers, youth sports practice facilities (e.g., soccer, baseball, football, basketball), youth sports associations and location of facilities, swimming pools (e.g., private and/or public), and/or the like.

In one embodiment, one or more databases may include information regarding registry of sex offenders, including addresses of sex offenders. This information may be used in conjunction with the distance between structures and/or land to provide distance measurements from a place of interest to one or more addresses of one or more sex offenders. For example, a place of interest may be a proposed or existing school. The distance between the school and the one or more addresses of one or more sex offenders may be provided to a user in a sex offender report. The sex offender report may include, but is not limited to, one or more pictures or one or more sex offenders within a geographic area, addresses of the one or more sex offenders, criminal history of the one or more sex offenders, distance between the place of interest and the one or more sex offenders, sketches of one or more structures inhabited by the one or more sex offenders and/or the like. In some embodiments, information such as community crime statistics, criminal record checks of neighbors, and/or the like, may be included within the sex offender report, a separate report, a report described herein, and/or any other similar reporting.

In some embodiments, using the system and methods as described herein, traffic flow may be determined and/or improved. In one example, a road may be mapped and/or modeled using the system and methods described herein. Traffic count may be made either physically on-site and/or using the system and methods as described herein. Using the traffic count and modeling of the road, traffic flow may be determined, altered, and/or improved. For example, for improvement, the model may be used to further include a base for developing additional routes (e.g., roads) in the area to ease traffic congestion. Modeling structures and land surrounding the road may further include additional information regarding development of additional routes.

In some embodiments, the systems and methods as described herein may be used for a property tax assessment. For example, using the methods as described in FIG. 4, physical attributes of the structure 102, and the structure 102 itself, may be determined, including distances, areas, and dimensions. A sketch and/or model may be determined for the structure 102 as well. The measurements and sketch may be used in a property tax assessment report similar to the foundation estimate report 200 and the window replacement estimate report 300. The property tax assessment report may include the sketch and/or model of the structure 102 and/or property, physical attributes of the structure 102 and/or property (e.g., grade, condition, dimensions, and/or the like), details of the assessed value of the structure 102 and/or property, current and/or historic values of the property (e.g., based on taxes, market value, and/or the like), additional imagery included by the tax assessor, a tax map, and/or other similar features.

In some embodiments, the system and methods as described herein may be used in formulation of an insurance report. The insurance report may be similar to the foundation estimate report 200 and the window replacement estimate report 300. The insurance report may include risks of weather hazards, maps of weather hazard risks, insurance ratings of structures and/or land, prior claim history for structures 102 and/or land, information from the emergency service report and/or the utility report discussed above, and/or the like. Using the methods as described in FIG. 4, distances of hazards and/or to hazards may be determined in some embodiments. Additionally, the square footage of the entire structure 102 and/or portions of the structure 102 may be determined. Based on the square footage, replacement cost estimates may be generated for replacement by total square footage or living area and included within the insurance report, for example.

In some embodiments, using the methods as described in FIG. 4, for example, the program logic 42 may include instructions to determine and report the orientation of a facet of the structure 102 relative to a street, by determining which facet of the structure 102 faces the street and/or is the front of the structure 102. For example, determining which facet faces the street may be carried out by determining a center of the structure 102, projecting a line connecting the center of the structure to a known location of the street address of the structure, and designating a facet positioned between the center and the street with which the line intersects as the street-facing facet. As described above, the program logic may determine the X, Y, and Z location of the corner of the structure 102. The center of the structure 102 may be determined by averaging the X coordinates of each corner and the Y coordinates of each corner of the structure 102. The known location on the street where the street address of the structure 102 is located may be obtained from a separate database, such as the T.I.G.E.R. (Topologically Integrated Geographic Encoding and Referencing) database, for example.

In an exemplary embodiment, determining which facet of the structure 102 faces the street may be carried out by selecting a facet that is substantially parallel or angled at a predetermined angle relative to the street. The predetermined angle may be substantially perpendicular to the street, or any other desired angle. An automated or semi-automated algorithm may be used to determine the front of the structure, and a user or an administrator may review the determination of the algorithm and accept or edit the determination, or direct the algorithm to start over, for example. Information identifying the front of the structure 102 can be used for a variety of different transformative or analysis applications. For example, the image of the determined front facet of the structure 102 may be retrieved and displayed as the initial or default view of a virtual property report according to the inventive concepts disclosed herein, including the location of the main or front entrance to the structure, for example. Further, a street access to the structure 102 may be identified for law-enforcement or emergency services accessing the database 40, to include a main entrance for personnel, a back or side entrance, a driveway, alleyway, or street access for vehicles, and combinations thereof, for example. The front of the structure 102 and/or information about vehicle or personnel access to the property and/or structure 102 may be stored in the database 40, and may be provided as part of a virtual property report, for example. Similarly, the back of the structure 102 may be determined to be the facet that is offset by about 180° from the determined front of the structure 102 as will be appreciated by persons of ordinary skill in the art.

The determined front and back facets of the structure 102 may be included in a variety of virtual property reports according to the inventive concepts disclosed herein, such as an emergency response report showing the street access for vehicles to the structure 102 and/or the property surrounding the structure (e.g., where the street address location of the structure 102 does not correspond to the location of a driveway or entryway into the structure 102), the location of a main personnel entrance to the structure 102, the location of a secondary or back entrance to the structure 102, the location of nearby fire hydrants, overhanging power or utility lines, etc., to enable emergency personnel to determine the best way to access the structure and respond to an emergency, such as medical emergencies, police emergencies, fires, floods, earthquakes, gas leaks, tornados, and other emergency situations, for example.

Using the methods as described in FIG. 4, for example, the program logic 42 may also include instructions to determine and report changes to structures 102 and/or land. The program logic 42 may include instructions, that when executed by the first and/or second host systems 12a and 12b cause the first and/or second host systems 12a and 12b to store the following information in the database(s) 40: the location of one or more structures 102 (such as by address, or latitude and longitude, for example) measurements of the structures 102 and/or the land, identities of the measurements (such as height to eave, area of roof, length, width, or area of front flower bed, etc.) as well as the date in which the measurement(s) are taken. This can be accomplished by the database 40 having one or more tables with predetermined fields (e.g., area of roof field, height to eave field, length of front flower bed field, length of rear flower bed field, number of windows field, etc.) to store the measurements. For example, the structure 102 can be detected and/or measured on a first date, e.g., Jan. 1, 2011, and data indicative of the measurement type and date stored in the database 40. The same structure 102 can be detected and/or measured on a second date, e.g., Jan. 1, 2012, and the measurements, measurement type, and date stored. The system may detect differences in the size, location, dimensions, or appearance of any objects or structures between the two times, and combinations thereof, for example. The first and/or the second host systems 12a and 12b can be programmed to periodically, randomly, and/or with user activation, check for any differences in the measurements of the structure 102. If differences in measurements above a predefined amount (e.g., 0%, 5% or the like) are determined, a change report identifying the structure(s) 102 and the changes can be prepared and output by the first and/or second host systems 12a and 12b to one or more of the user devices 14 as a web page, form and/or a computer file.

The system 10 may be used by humans operating the user devices 14 to view and measure an object, such as the structure 102 and/or the land, in an oblique and/or ortho-image using image display and analysis software, as described for example in U.S. Pat. No. 7,424,133; and U.S. Patent Application No. 2012-0101783. The program logic 42 can include instructions for storing the structure measurement information into the database(s) 40 with or without the users knowing that the measurements are being stored. The structure measurement information may include the following: the location of one or more structures 102 (such as by address, or latitude and longitude, for example) measurements of the structures 102 and/or the land, measurement type (such as height to eave, area of roof, length of front flower bed, etc.) as well as the date in which the measurement(s) are taken. This can be accomplished by providing a web page to the user's user device 14 requesting the user to assign a measurement type to the measurement. For example, a field on a web page or form can be provided with a predetermined list of measurement types such as area of roof, height to eave, length of lot, or the like and a button on the web page or form can be used by the user to indicate that a measurement type has been selected. Alternatively, the image and the measurement can be automatically provided by the first and/or the second host systems 12a and 12b to another user device 14 to be viewed by another user, who assigns and stores a measurement type to the measurement using the user device 14. The first and/or the second host systems 12a and 12b receive and store the measurement and measurement type in the database(s) 40. Automated or semi-automated algorithms may be used to make any of the determinations and/or measurements described herein, and a user or an administrator may review the determinations and/or measurements of the algorithms and accept or edit the measurement or determination, or direct the algorithm to start over, for example.

It should be noted that the inventive concepts disclosed herein are capable of other embodiments or of being practiced or carried out in various ways. For example, several embodiments include one or more data sets. Each data set may be included solely in that report, or be included in one more other reports as described herein. For example, the change report can be combined with the roof report, or the assessment report to provide the user with information regarding the current and historical measurements of the structure 102. Additionally, data sets within each report may stand-alone. For example, the real estate data set may be a stand-alone report not associated with other reports as described herein. It should also be noted that although "reports" are generated herein, such information need not be distributed in the form of a report. For example, the system 10 may determine there are 3 chimneys and distribute this information solely without inclusion within a "report."

From the above description, it is clear that the inventive concepts disclosed and claimed herein are well adapted to carry out the objects and to attain the advantages mentioned herein, as well as those inherent therein. While exemplary embodiments of the inventive concepts have been described for purposes of this disclosure, it will be understood that numerous changes may be made which will readily suggest themselves to those skilled in the art and which are accomplished within the broad scope and spirit of the inventive concepts disclosed herein and/or as defined in the appended claims.

The invention claimed is:

1. A computer system comprising at least one processor capable of executing processor executable code operably coupled with a non-transitory computer medium storing processor executable code, which when executed by the at least one processor causes the at least one processor to:
receive a first signal over a computer network, the first signal indicative of a request for information about a target structure from a user;
in response to receiving the first signal, access a database including information about the target structure;
determine, using aerial imagery and at least one data set indicative of street files including information indicative of at least one of location of one or more street addresses of structures and location of one or more street, information indicative of orientation of one or more facet of the target structure relative to one or more street in the street files, the determination at least in part based on determining a center of the target structure, projecting a line connecting the center of the target structure to the location of the street address of the structure, and designating a facet of the target structure positioned between the center and the street with which the line intersects as a street-facing facet of the target structure;
retrieve one or more image of the one or more facet of the target structure orientated toward the street; and
transmit a second signal over the computer network, the second signal indicative of a virtual property report for the target structure including the one or more image of the one or more facet of the target structure orientated toward the street.

2. The computer system of claim 1, wherein the processor executable code when executed by the at least one processor causes the processor to determine, using the aerial imagery and the at least one data set indicative of street files, information about one or more of: location of a main entrance of the target structure relative to the street, location of a secondary entrance of the target structure relative to the street, location of vehicle access to the target structure within the one or more image, and store the information in a database and associated with the target structure.

3. The computer system of claim 2, wherein the processor executable code for determining the information is organized to be executed by the at least one processor prior to executing the code to receive the first signal.

4. The computer system of claim 1, wherein prior to the step of receiving the first signal over the computer network, the processor executable code when executed by the at least one processor causes the at least one processor to receive a selection of one or more pixels within a displayed image of the target structure in which the one or more pixels have pixel coordinates, transform the pixel coordinates into real-world geographic coordinates, measure distances between the real-world coordinates, and store the measurements on a non-transitory computer readable medium within a database and associated with the target structure.

5. The computer system of claim 4, wherein the processor executable code when executed by the at least one processor causes the at least one processor to associate a label identifying the measurement with a particular measurement, and store the label with the measurement within the database and associated with the target structure.

6. The computer system of claim 5, wherein the label identifying the measurement is a particular field within the database.

7. The computer system of claim 5, wherein the label is selected from the group including orientation and area of a driveway depicted within the displayed image, size or area of a deck depicted within the displayed image, location and height of trees adjacent to the target structure, areas of windows of the target structure, area of a vertical or pitched surface on the target structure, a height of an eave of the target structure, a height of a chimney of the target structure, a distance to a church from the target structure.

8. The computer system of claim 1, wherein the processor executable code when executed by the at least one processor causes the at least one processor to analyze a parcel database to determine an identity of neighboring parcels either adjacent to the target structure or within a predefined radius of the target structure, and to make available to a user information related to neighboring parcels when accessing information indicative of the target structure.

9. The computer system of claim 8, wherein the processor executable code when executed by the at least one processor causes the at least one processor to identify ownership or residency of neighboring parcels and to store a link within the database to information indicative of the owners or residents of neighboring parcels.

10. The computer system of claim 8, wherein the processor executable code when executed by the at least one processor causes the at least one processor to identify social media information of owners or residents of neighboring parcels and to store information within the database indicative of the social media information of the owners or residents of the neighboring parcels.

11. A computer system comprising at least one processor capable of executing processor executable code operably coupled with a non-transitory computer medium storing processor executable code, which when executed by the at least one processor causes the at least one processor to:

receive a first signal over a computer network, the first signal indicative of a request for information about a target structure from a user;

in response to receiving the first signal, access a database including multiple aerial images of the target structure;

automatically identify an aerial image depicting a facet of the target structure that faces a street from the multiple aerial images by:

accessing from the data set indicative of street files a file identifying the street;

projecting a line through at least a portion of a facet of the target structure to the street; and identifying the facet that the line is projected through as the facet of the target structure that faces the street;

retrieve the aerial image depicting the facet of the target structure that faces a street; and transmit a second signal over the computer network, the second signal indicative of the aerial image of the target structure depicting the facet of the target structure that faces the street.

12. The computer system of claim 11, wherein the processor executable code causes the processor to transmit a sequence of third signals depicting the multiple aerial images following the transmission of the second signal.

13. The computer system of claim 11, wherein the processor executable code further causes the at least one processor to identify a rear facet of the target structure as a facet that is positioned at about 180° relative to the facet of the target structure that faces the street.

14. The computer system of claim 11, wherein the processor executable code further causes the at least one processor to determine, using aerial imagery and at least one data set indicative of street files, information indicative of elements of the target structure facing the street, including information about one or more of: a facet of the target structure facing a street, location of a main entrance of the target structure relative to the street, location of a secondary entrance of the target structure relative to the street, location of vehicle access to the target structure within the aerial image depicting the facet of the target structure that faces the street.

15. The computer system of claim 11, wherein projecting a line through at least a portion of a facet of the target structure to the street further comprises projecting a line connecting a center of the target structure to a known location of a street address of the target structure.

* * * * *

UNITED STATES PATENT AND TRADEMARK OFFICE
CERTIFICATE OF CORRECTION

PATENT NO. : 9,753,950 B2
APPLICATION NO. : 13/840258
DATED : September 5, 2017
INVENTOR(S) : Stephen L. Schultz, David Arthur Kennedy and James Smyth It is certified that error appears in the above-identified patent and that said Letters Patent is hereby corrected as shown below:

In the Specification

Column 11, Lines 38-67:
Delete "Referring to FIG. 8, in a step 102, the first host system 12a and/or the second host system 12b may determine horizontal edges 104 that meet the outermost vertical edges 106. Alternatively, the determination may be for vertical edges 106 that meet the outermost horizontal edges 104.
The first host system 12a and/or the second host system 12b may further determine if multiple facets of the structure 102 exist within the image, as in steps 106-114. In some embodiments, however, the first host system 12a and/or the second host system 12b may skip the determination of multiple facets and proceed to step 116. Determination of facets may be useful in defining property attributes such as windows, siding, eaves, and the like, as will be discussed in further detail herein. Referring to steps 106-114, in determining facets, the first host system 12a and/or the second host system 12b may extrapolate the horizontal edges 104, vertical edges 106, and/or sloped edges 108 of each facet of the structure 102, as in step 108. The first host system 12a and/or the second host system 12b may pair the vertical edges 106 and/or pair the horizontal edges 104 to determine the number of facets of the structure 102 within the boundary area 103 of the image, as in step 110. Property attributes (e.g., significant features) of the structure 102 may be detected, as in step 112. For example, using pairings of horizontal edges 104, vertical edges 106, and/or sloped edges 108, windows may be detected on the structure 102. Additional property attributes may include, but are not limited to, eaves, siding, chimney(s), and/or the like.
In a step 114, the first host system 12a and/or the second host system 12b may locate geometric vertices of each facet"

Signed and Sealed this
Twenty-fourth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,753,950 B2

Column 12, Lines 1-2:
Delete "of the structure 102. In some embodiments, geometric vertices may be determined by an angle of intersection ($\Theta$)"